US008763226B1

(12) United States Patent
Gustafson

(10) Patent No.: US 8,763,226 B1
(45) Date of Patent: Jul. 1, 2014

(54) RECEIVER PLATE-COUPLER PLATE ASSEMBLY

(76) Inventor: John E. Gustafson, Fall Creek, WI (US)

( * ) Notice: Subject to any disclaimer, the term of this patent is extended or adjusted under 35 U.S.C. 154(b) by 221 days.

(21) Appl. No.: 13/317,237

(22) Filed: Oct. 11, 2011

Related U.S. Application Data

(60) Provisional application No. 61/462,123, filed on Jan. 29, 2011.

(51) Int. Cl.
*B25B 11/00* (2006.01)
(52) U.S. Cl.
USPC .......................................... 29/281.1; 29/283.1
(58) Field of Classification Search
USPC ............................... 29/281.1, 281.3, 270, 244
See application file for complete search history.

(56) References Cited

U.S. PATENT DOCUMENTS

| 3,885,852 | A | * | 5/1975 | Grove | 439/441 |
| 4,815,169 | A | * | 3/1989 | Valleau | 452/161 |
| 7,090,530 | B1 | * | 8/2006 | Dibble | 439/441 |
| 7,108,475 | B1 | | 9/2006 | Gustafson | |
| 7,226,268 | B2 | | 6/2007 | Gustafson et al. | |
| 7,648,326 | B2 | | 1/2010 | Santele et al. | |
| 2003/0178218 | A1 | * | 9/2003 | Shotey et al. | 174/66 |
| 2008/0084017 | A1 | * | 4/2008 | Barziza | 269/60 |
| 2012/0193124 | A1 | * | 8/2012 | Simnacher | 174/137 R |

* cited by examiner

*Primary Examiner* — Lee D Wilson
(74) *Attorney, Agent, or Firm* — Tipton L. Randall

(57) ABSTRACT

A receiver plate-coupler plate assembly for attaching an implement to a machine. The assembly includes a receiver plate member comprising a vertical plate section with at least three perimeter walls extending in a common direction to form a downward facing cavity there between. The vertical plate member attaches to a tool on a plate section surface opposite the perimeter walls. A coupler plate member comprises a vertical plate section positioned against the receiver plate member within the downwardly facing cavity thereof. At least one locking assembly on the coupler plate member reversibly engages the receiver plate member to maintain the coupler plate member within the downward facing cavity thereof. At least one connector assembly secured to the coupler plate member opposite the receiver plate member connects the receiver plate-coupler plate assembly to a machine.

10 Claims, 35 Drawing Sheets

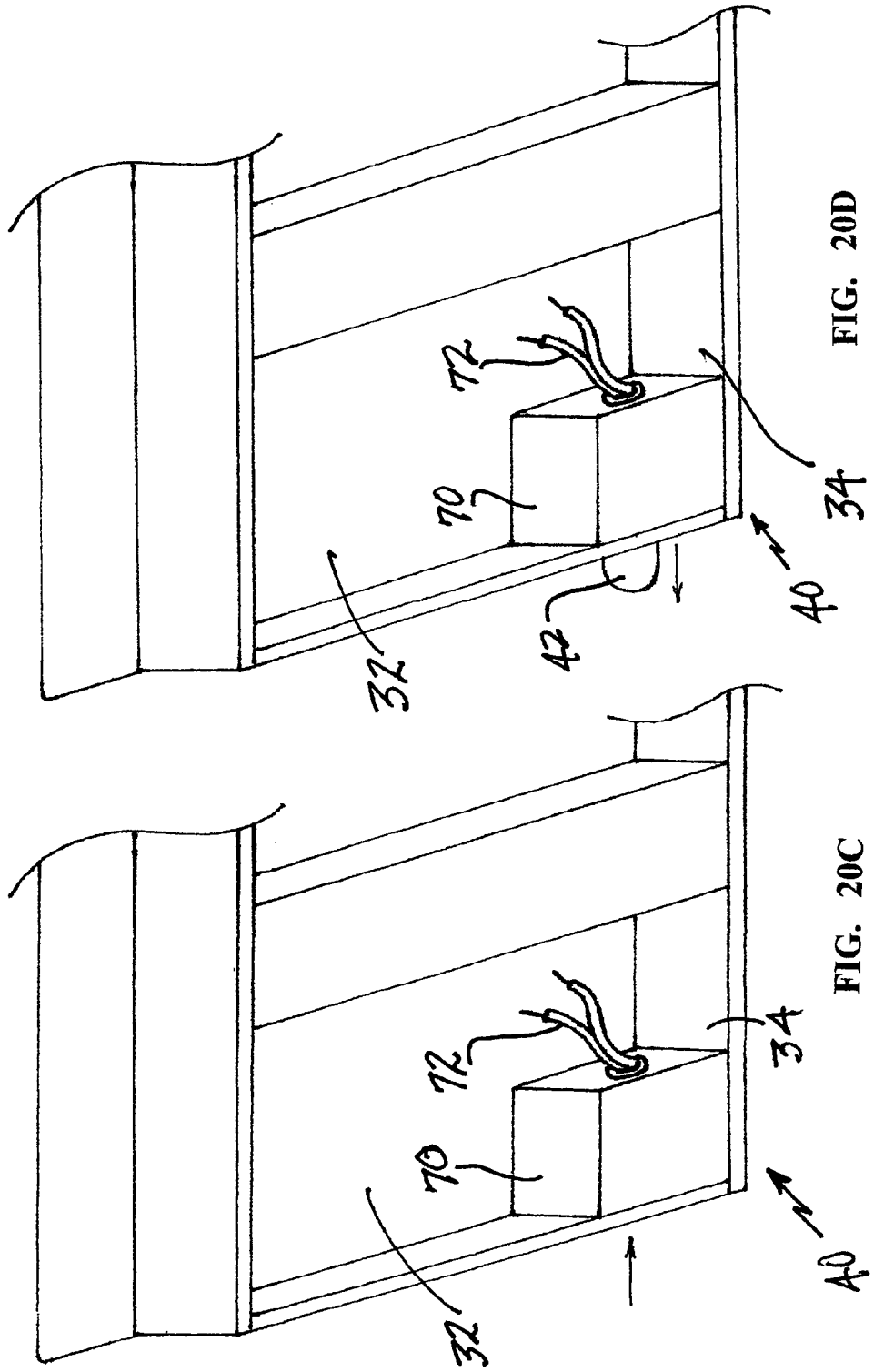

RECEIVER PLATE-COUPLER PLATE ASSEMBLY

CROSS-REFERENCE TO RELATED APPLICATIONS, IF ANY

This application claims the benefit under 35 U.S.C. §119 (e) of co-pending provisional application Ser. No. 61/462,123, filed 29 Jan. 2011. Application Ser. No. 61/462,123 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to mounting of implements to a machine and, more particularly, to an assembly for mounting of implements to a machine and, most particularly, to a receiver plate-coupler plate assembly for mounting of implements to a machine.

2. Background Information

It is well-known to secure an implement or tool to a machine in order to perform various tasks with the implement thorough use of the machine. In many situations, a single implement is secured to a machine for repeated use in performing a particular task. If the machine can be dedicated for use with a single implement, there is little need to disconnect and reconnect the implement to the machine. However, there are many situations where it is economically prudent to have the ability to connect and/or disconnect a plurality of implements to a single machine in order to perform a variety of tasks, saving both time and expense.

Applicant has devised a mechanical assembly that is suitable for mounting a variety of implements to a single machine. In addition, the mechanical assembly provides facile connection or disconnection between the implement and the machine.

SUMMARY OF THE INVENTION

The invention is a receiver plate-coupler plate assembly for attaching an implement to a machine. The assembly includes a receiver plate member comprising a vertical plate section with at least three perimeter walls extending in a common direction to form a downward facing cavity there between. The perimeter walls include a pair of opposed apertures therein. The vertical plate member is adapted for attachment to a tool on a plate section surface opposite the perimeter walls. A coupler plate member comprises a vertical plate section positioned against the receiver plate member within the downwardly facing cavity thereof, with the vertical plate section having at least three perimeter walls extending in a common direction opposite the receiver plate member. At least one locking assembly is present for reversibly maintaining the coupler plate member within the downward facing cavity of the receiver plate member. At least one connector assembly is secured to the at least three perimeter walls of the coupler plate member opposite the receiver plate member. The at least one connector assembly is adapted for connecting the receiver plate-coupler plate assembly to a machine.

BRIEF DESCRIPTION OF THE DRAWINGS

FIG. 20C is a perspective view of a second orientation of the locking assembly of FIG. 20A of the present invention in an unlocked condition.

FIG. 20D is a perspective view of the locking assembly of FIG. 20C of the present invention in a locked condition.

DESCRIPTION OF THE EMBODIMENTS

Nomenclature

10 Receiver Plate-Coupler Plate Assembly
20 Receiver Plate Member
22 Vertical Plate Section
23 Location Rods
24 Perimeter Walls
26 Downward Facing Cavity
28 Aperture in Perimeter Wall
30 Coupler Plate Member
32 Vertical Plate Section
33 Hollow Tubing
34 Perimeter Walls
35 Apertures in Vertical Plate Section
35a Open End of Tubing
38 Aperture in Perimeter Wall
40 Locking Assembly
41 Retainer Pin
42 Rigid Linear Member
43 Tube Member of Locking Assembly
44 Handle Section
46 Spring-Biased Linkage
47 Spring Member
48 Upper End of Spring-Biased Linkage
49 Lower End of Spring-Biased Linkage
50 Connector Assembly of Coupler Plate Member
52 Linear Members
54 Bracket Units
55 Coupler Plate Extension Members
55a Fastener Device of Extension Members
56 Connector Plate Member
58 Peg Members
60 Fastener Brackets
62 Pivot Point Attachments
70 Solenoid Unit
72 Electrical Control Wires
80 Modified Receiver Plate Member
82 Vertical Plate Section
84 Perimeter Walls
86 Downward Facing Cavity
B Single Boom Arm
H Receiver Hitch
P Solid Peg
S Bale Spear Construction The invention is a receiver plate-coupler plate assembly for attaching an implement to a machine. The assembly includes a receiver plate member comprising a vertical plate section with at least three perimeter walls extending in a common direction to form a downward facing cavity there between. The perimeter walls include a pair of opposed apertures therein. The vertical plate member is adapted for attachment to a tool on a plate section surface opposite the perimeter walls. A coupler plate member comprises a vertical plate section positioned against the receiver plate member within the downwardly facing cavity thereof, with the vertical plate section having at least three perimeter walls extending in a common direction opposite the receiver plate member. At least one locking assembly is present for reversibly maintaining the coupler plate member within the downward facing cavity of the receiver plate member. At least one connector assembly is secured to the at least three perimeter walls of the coupler plate member opposite the receiver plate member. The at least one connector assembly is adapted for connecting the receiver plate-coupler plate assembly to a machine.

Figure 1:
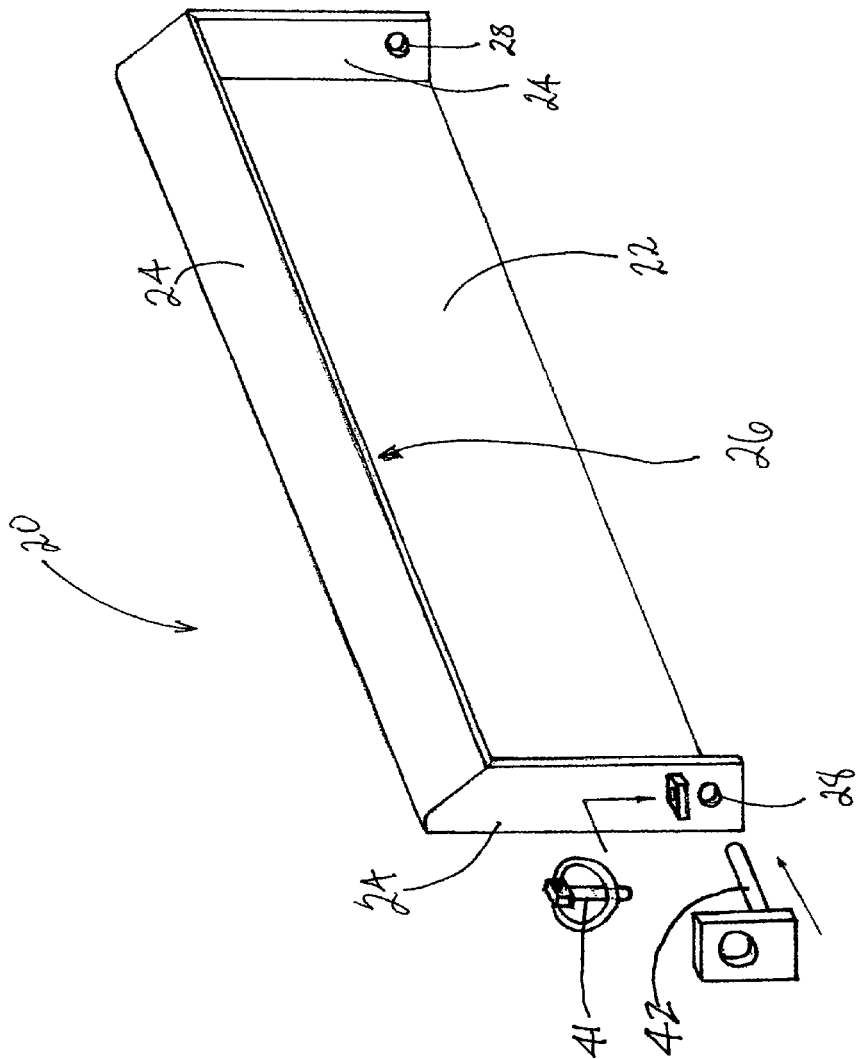
FIG. 1 is a perspective view of one embodiment of the receiver plate member of the present invention.

Referring now to FIG. 1, one embodiment of the receiver plate member 20 is illustrated. The receiver plate member 20 includes a vertical plate section 22 with at least three perimeter walls 24 extending in a common direction to form a downward facing cavity 26 there between. The vertical plate section 22 attaches to a tool on a plate section surface opposite the perimeter walls 24. In the embodiment of FIG. 1, the receiver plate member 20 includes an aperture 28 in each of the opposed, vertical perimeter walls 24, used for reversibly maintaining a coupler plate member 30 within the downward facing cavity 26 of the receiver plate member 20. In this embodiment, a rigid linear member 42 is inserted into each of the apertures 28 and secured therein with retainer pin 41, as illustrated in FIG. 1.

Figure 2:
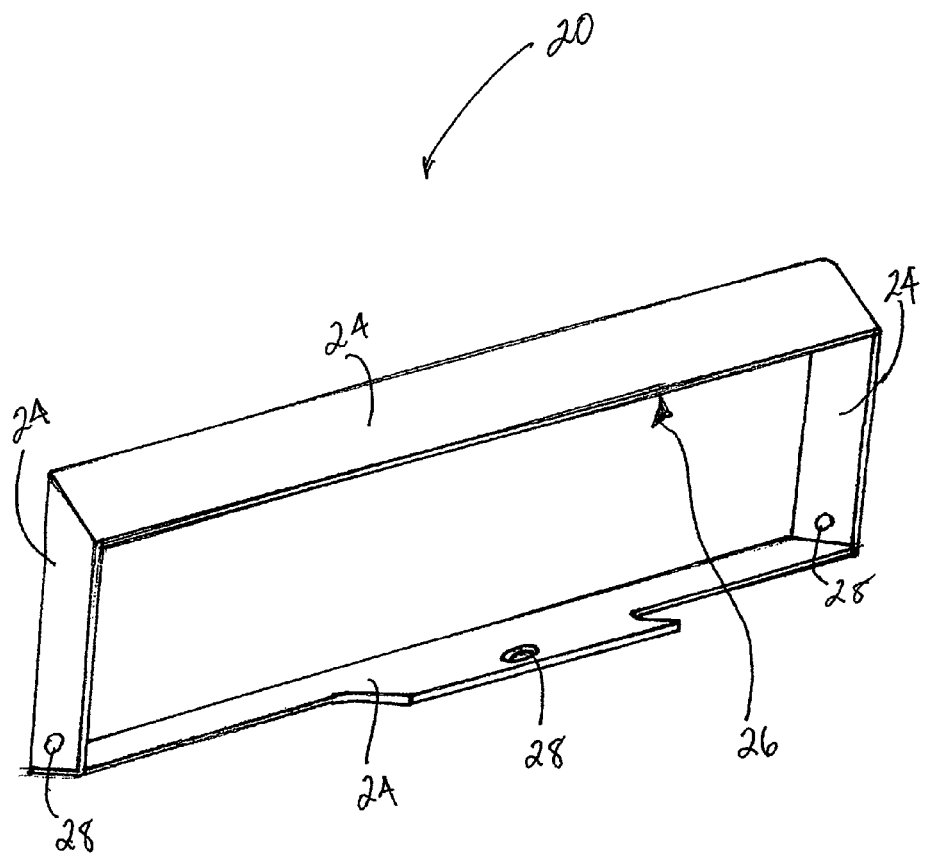
FIG. 2 is a perspective view of another embodiment of the receiver plate member of the present invention.

Referring now to FIG. 2, another embodiment of the receiver plate member 20 is shown, which includes a fourth perimeter wall 24 with a single aperture 28 for reversibly maintaining a coupler plate member 30 within the downward facing cavity 26 of the receiver plate member 20.

Figure 3A:
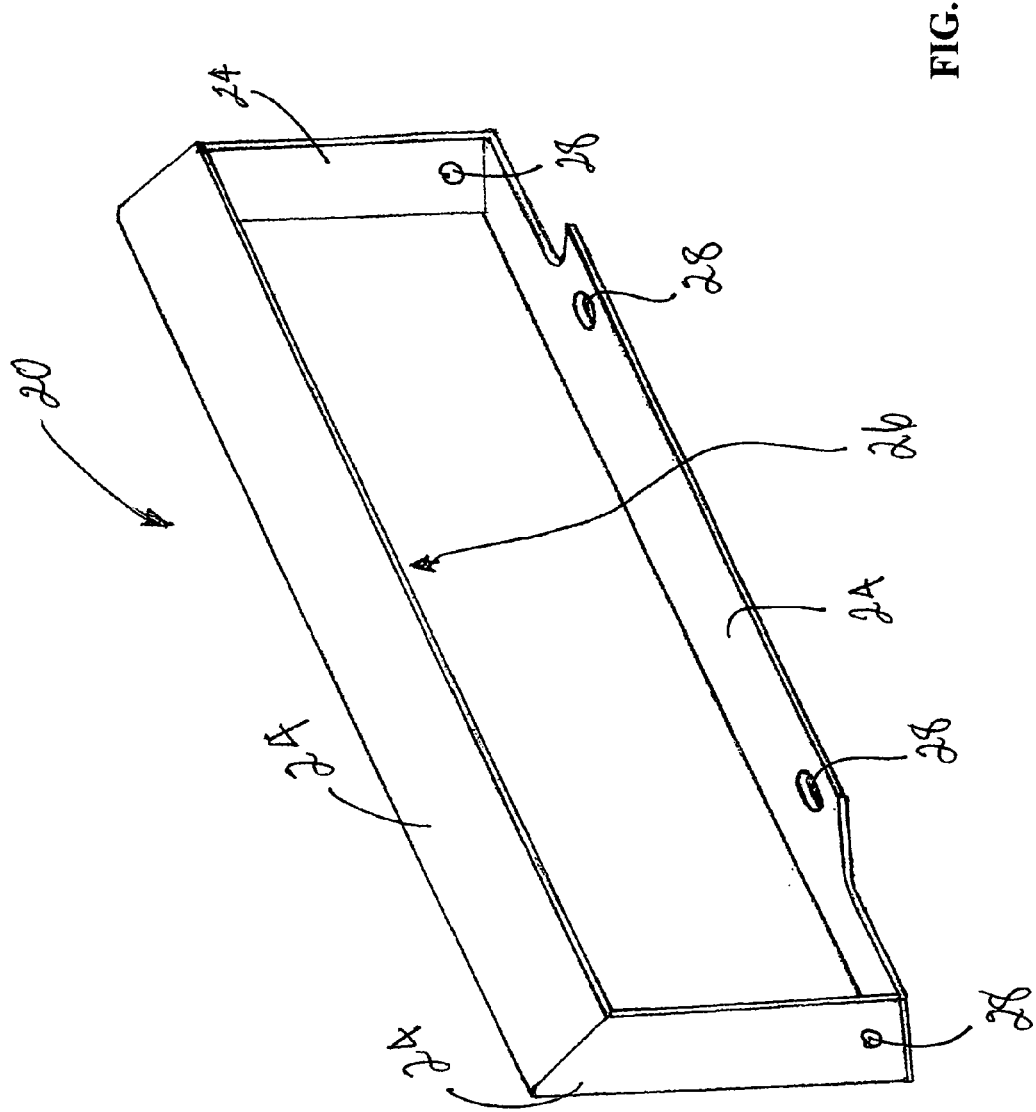
FIG. 3A is a perspective view of yet another embodiment of the receiver plate member of the present invention.
Figure 3B:
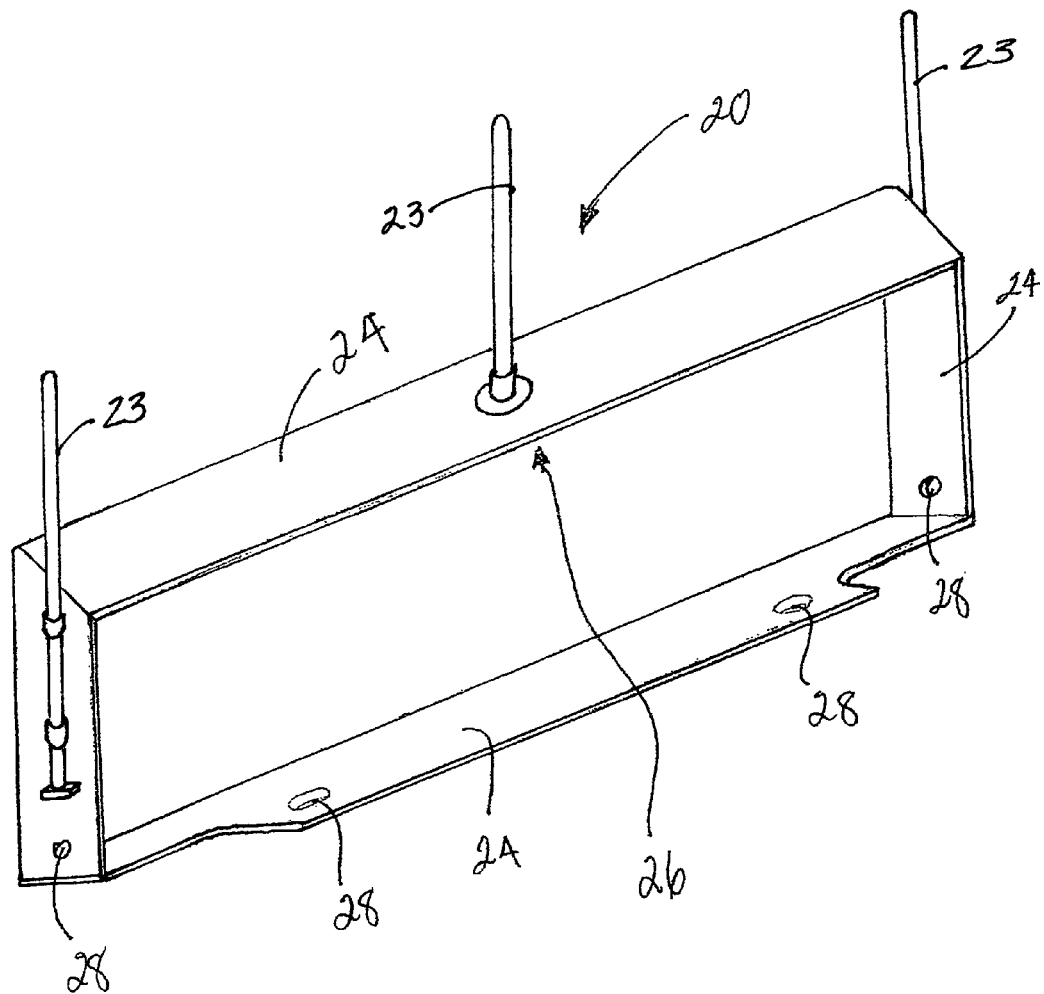
FIG. 3B is a perspective view of a further embodiment of the receiver plate member of FIG. 3A of the present invention.

Referring now to FIG. 3A, yet another embodiment of the receiver plate member 20 is shown, which includes a fourth perimeter wall 24 with two apertures 28 for reversibly maintaining a coupler plate member 30 within the downward facing cavity 26 of the receiver plate member 20. The opposed apertures 28 of the at least three perimeter walls 24 may optionally be omitted in embodiments of the receiver plate member 20 that include a fourth perimeter wall 24 containing one or more apertures 28 therein. FIG. 3B illustrates a further embodiment of the receiver plate member 20 of FIG. 3A. The receiver plate member 20 of FIG. 3B is fitted with a plurality of location rods 23 secured to the perimeter walls 24 and extending upwardly from the receiver plate member 20. The location rods 23 assist a machine operator in gauging the location of the edges and center of the receiver plate member 20 when attached to a machine.

Figure 4:
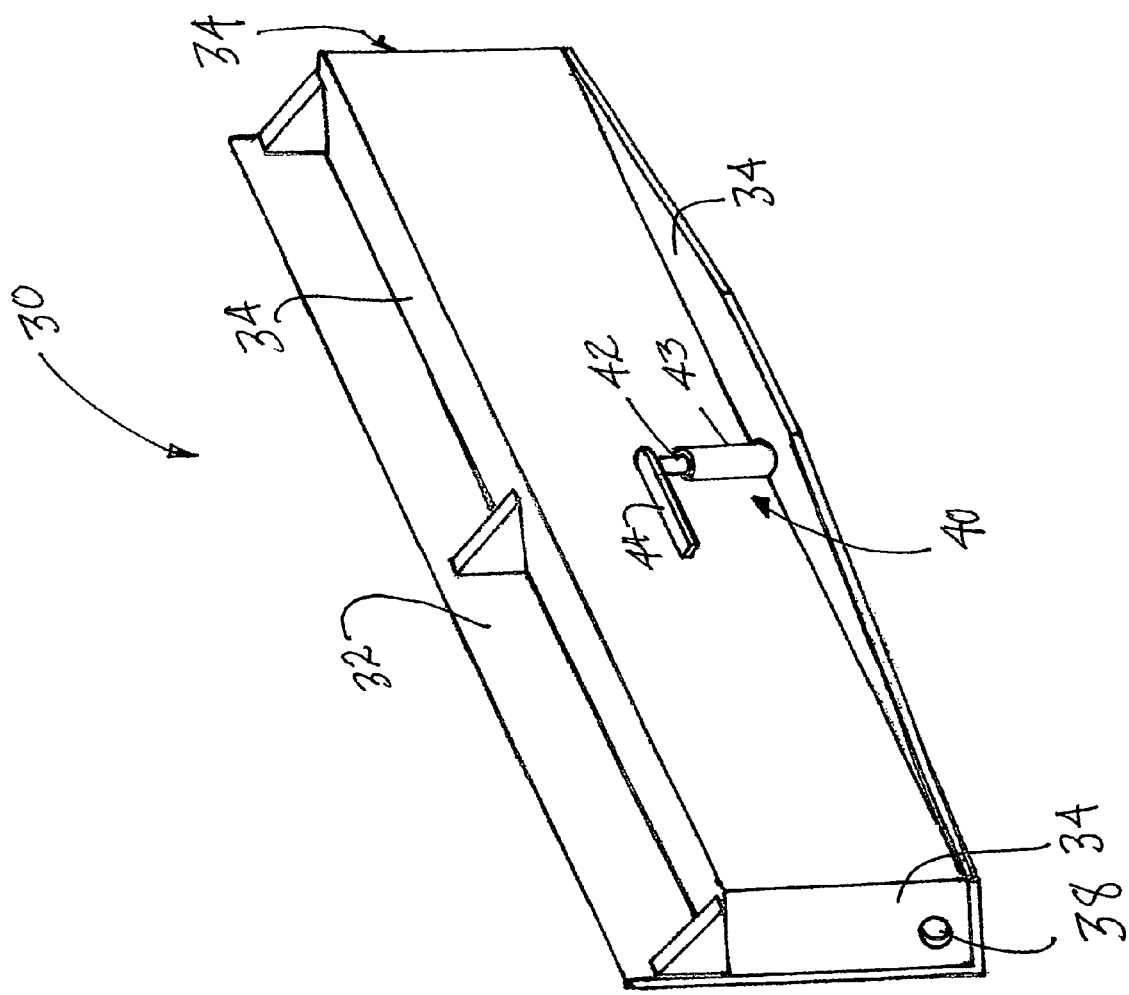
FIG. 4 is a perspective view of one embodiment of the coupler plate member of the present invention.
Figure 5:
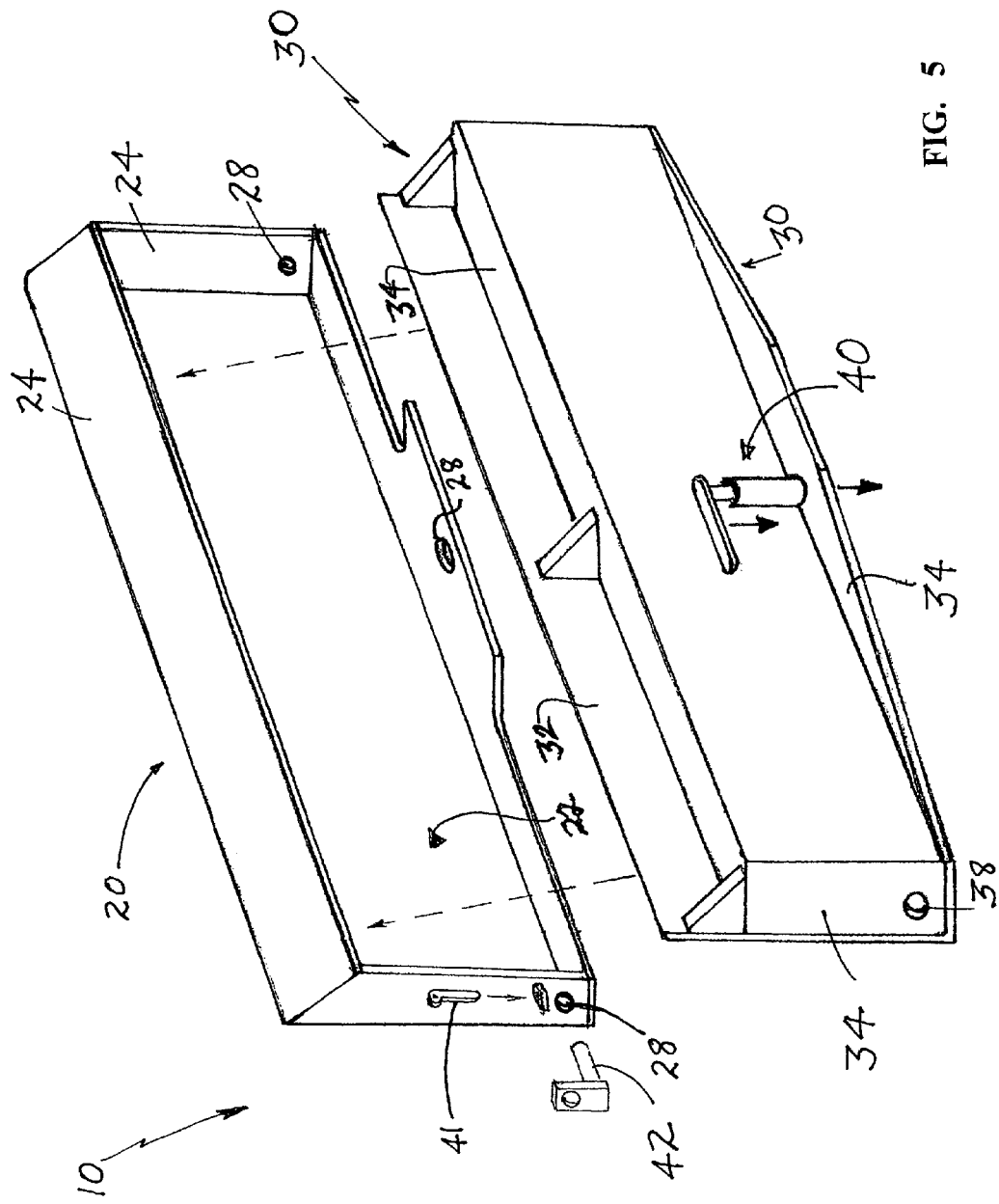
FIG. 5 is a perspective view of one embodiment of the receiver plate-coupler plate assembly of the present invention.

Referring now to FIG. 4, one embodiment of the coupler plate member 30 is illustrated. The coupler plate member 30 includes a vertical plate section 32, which is positioned against the receiver plate member 20 within the downwardly facing cavity 26 thereof. The vertical plate section 32 has at least three perimeter walls 34 extending in a common direction opposite the receiver plate member 20. In this embodiment of the coupler plate member 30, the vertical plate section 32 has four perimeter walls 34 extending in a common direction opposite the receiver plate member 20. At least one locking assembly 40 is present that reversibly maintains the coupler plate member 30 within the downward facing cavity 26 of the receiver plate member 20. In this embodiment, the locking assembly 40 engages an aperture 28 in the fourth perimeter wall 24 of the receiver plate member 20. Alternatively, the coupler plate member 30 can be secured to the receiver plate member 20 by the rigid linear members 42 inserted through the aligned apertures 28 of the receiver plate member 20 and the apertures 38 of the coupler plate member 30, as shown in FIGS. 1 and 5. FIG. 5 illustrates the engagement of the receiver plate member 20 of FIG. 2 with the coupler plate member 30 of FIG. 4 employing the locking assembly 40.

At least one connector assembly 50 is secured to the at least three perimeter walls 34 of the coupler plate member 30 opposite the receiver plate member 20. The at least one connector assembly 50 is adapted for connecting the receiver plate-coupler plate assembly 10 to a machine. The coupler plate member 30 of FIG. 4 is designed for engagement with the receiver plate member 20 of FIG. 2 to provide a receiver plate-coupler plate assembly 10, as depicted in FIG. 5.

Figure 6:
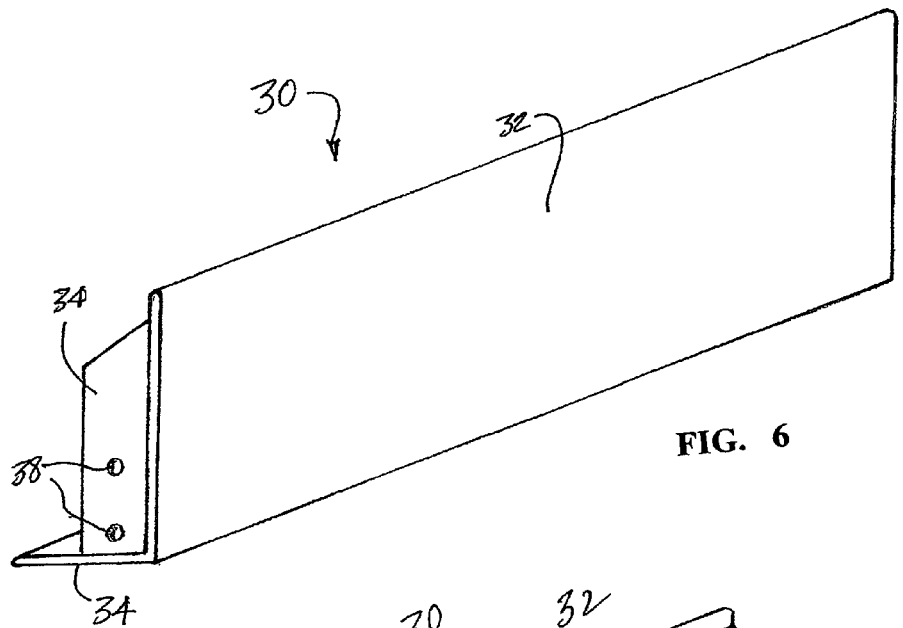
FIG. 6 is a perspective front view of another embodiment of the coupler plate member of the present invention.
Figure 7:
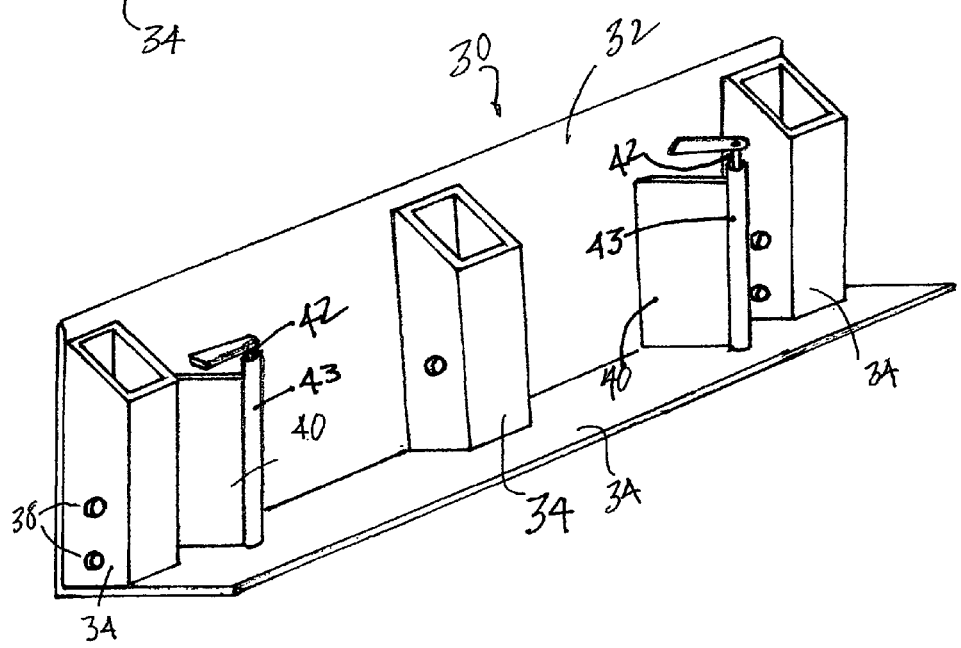
FIG. 7 is a perspective rear view of the embodiment of the coupler plate member of FIG. 6 of the present invention.

FIGS. 6 and 7 provides front and rear perspective views of another coupler plate member 30 of the present invention. The coupler plate member 30 of FIGS. 6 and 7 includes a vertical plate section 32, which is positioned against a receiver plate member 20 within the downwardly facing cavity 26 thereof. The vertical plate section 32 includes three perimeter walls 34 extending in a common direction opposite the receiver plate member 20. In this embodiment, two opposed perimeter walls 34 comprise square tubing that may also function to receive another square tube there within. There are two locking assemblies 40 on the coupler plate member 30, which reversibly engage an apertures 28 in the fourth perimeter wall 24 of the receiver plate member 20, shown in FIG. 3, to maintain the coupler plate member 30 within the downward facing cavity 26 thereof. In the embodiment of FIGS. 6 and 7, the locking assemblies 40 of this embodiment each include a rigid, linear member 42 mounted in a tube member 43, with the rigid linear members reversibly insertable into one of the aperture 28 in a perimeter wall 24 of the receiver plate member 20.

Figure 8:
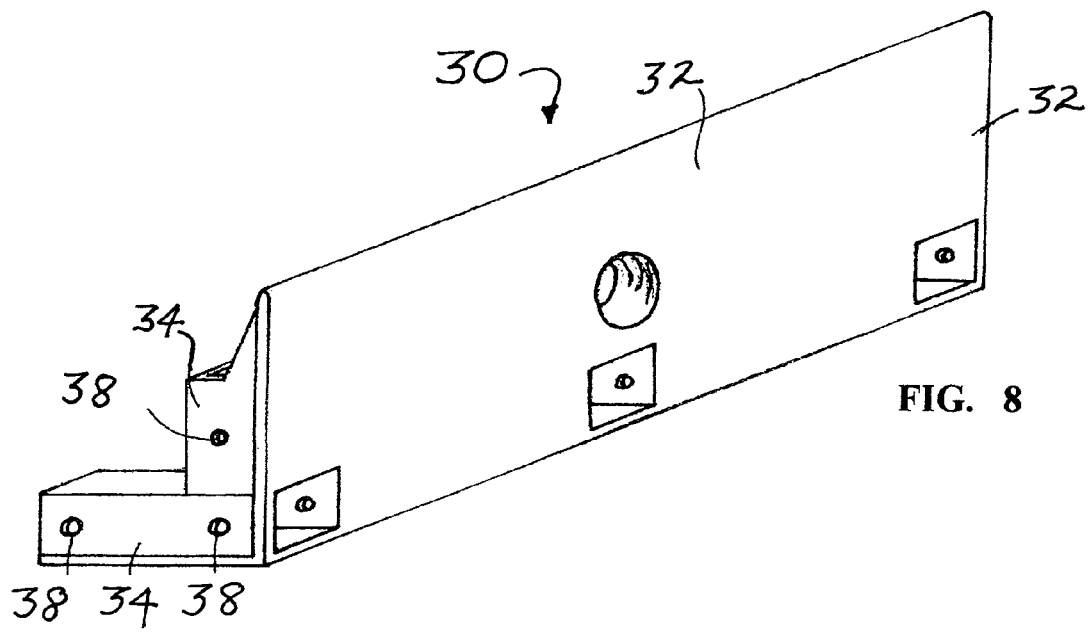
FIG. 8 is a perspective front view of another embodiment of the coupler plate member of the present invention.
Figure 9:
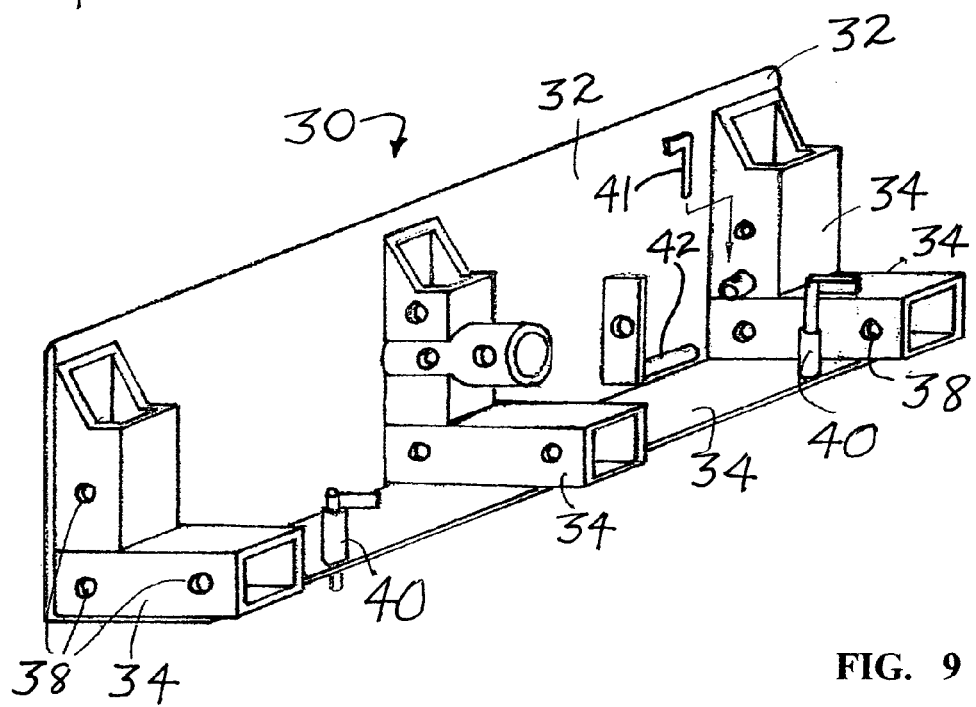
FIG. 9 is a perspective rear view of the embodiment of the coupler plate member of FIG. 8 of the present invention.

FIGS. 8 and 9 provides front and rear perspective views of another embodiment of the coupler plate member 30 of the present invention. In this embodiment, the perimeter walls 34 include square tubing mounted perpendicular to the vertical plate section 32 with an open end 35 positioned at the surface of the vertical plate section 32 for receiving and securing a tool therein, as illustrated in FIG. 11C. The open ends 35 of the tubing may be rectangular or round, and examples of such tools include a receiver hitch H, a bale spear S, and a solid peg P, as shown in FIG. 11C.

Figure 10A:
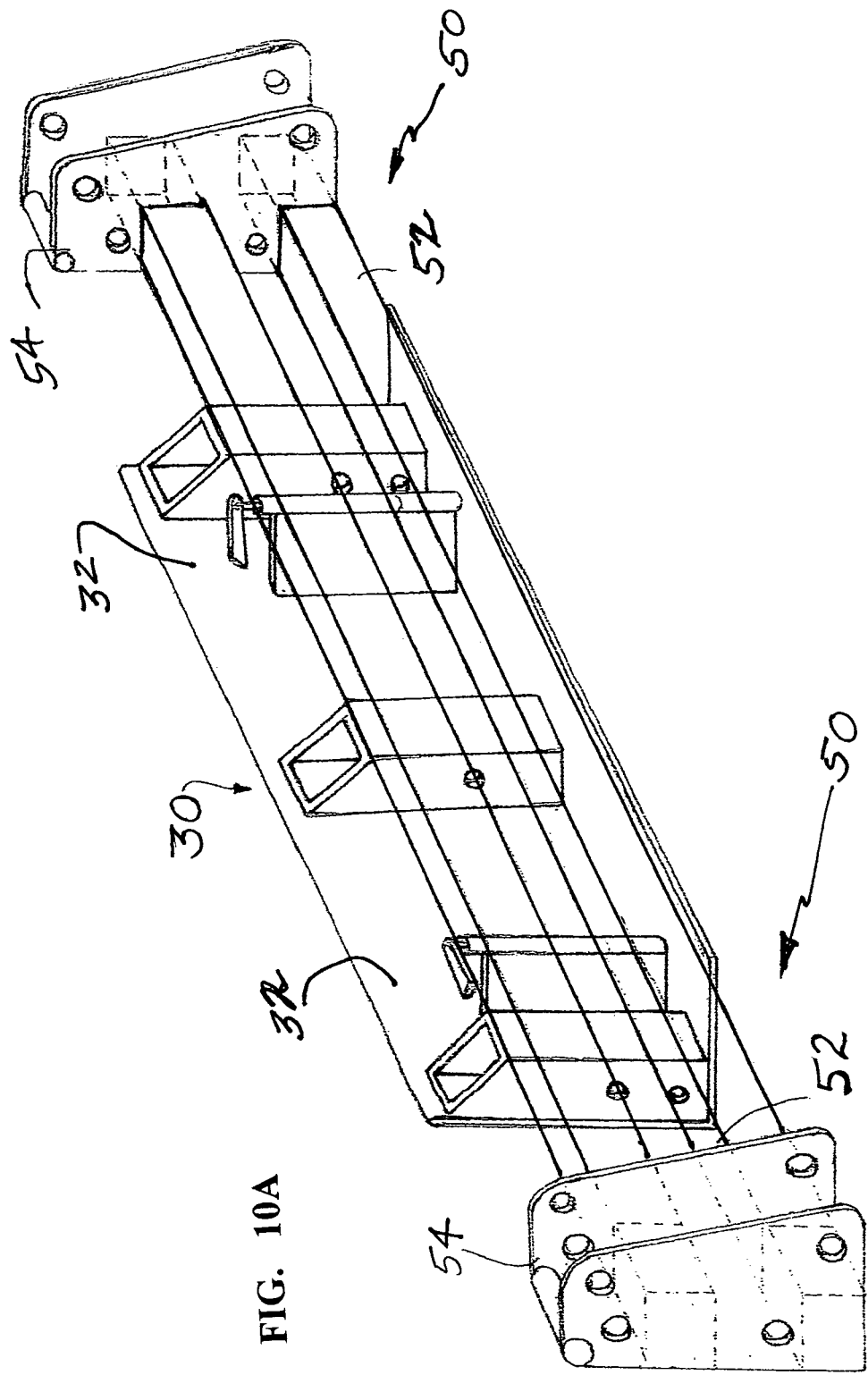
FIG. 10A is a perspective rear view of yet another embodiment of the coupler plate member of the present invention.
Figure 10B:
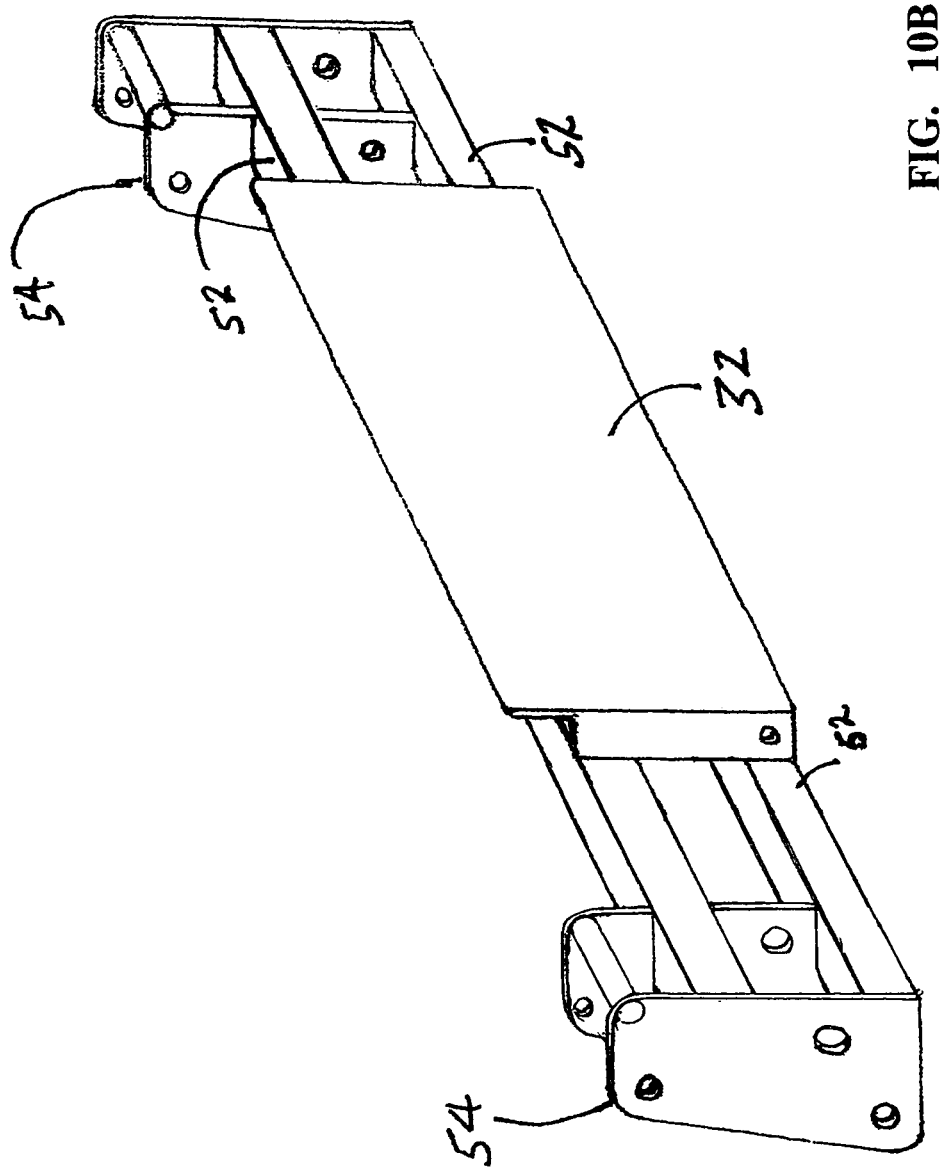
FIG. 10B is a perspective front view of the embodiment of the coupler plate member of FIG. 10A of the present invention.

Referring now to FIG. 10A, the coupler plate member 30 of FIGS. 6 and 7 is shown with one embodiment of the connector assembly 50 suitable for attachment to the two hydraulic arms of a machine, such as a tractor. The term tractor refers to a machine commonly known in the industry by this name, and does not include a skid steer or a mini skid steer. The connector assembly 50 includes horizontal, linear members 52 secured to the perimeter walls 34 of the coupler plate member 30 with each end thereof extending beyond the coupler plate member 30. The linear members 52, shown in phantom in FIG. 10A, include at each end thereof a bracket unit 54 adapted for attachment to an individual hydraulically powered arm of a machine, such as a tractor. FIG. 10B is a front view of the coupler plate member 30 with attached connector assembly 50 of FIG. 10A, with the linear members 52 fully shown.

Figure 11A:
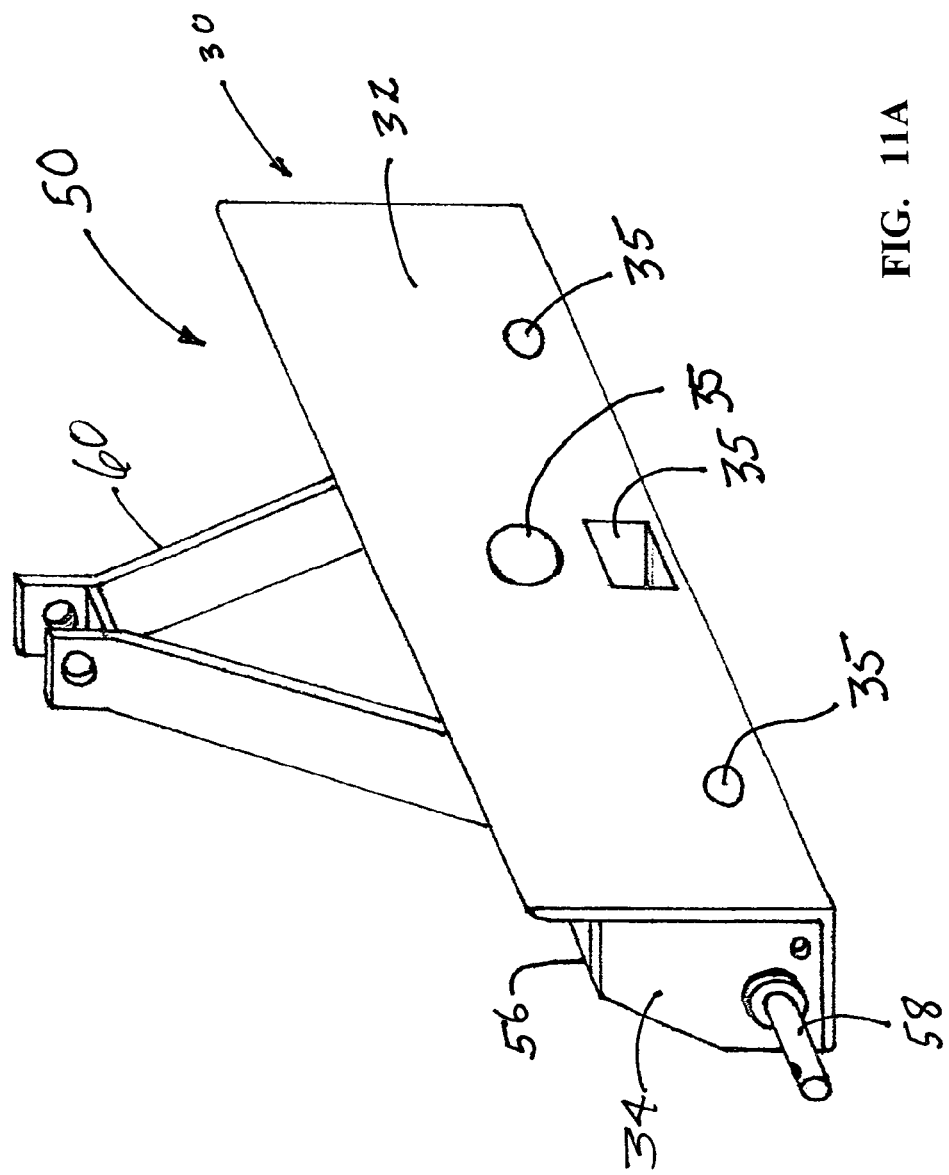
FIG. 11A is a perspective front view of yet another embodiment of the coupler plate member of the present invention.
Figure 11B:
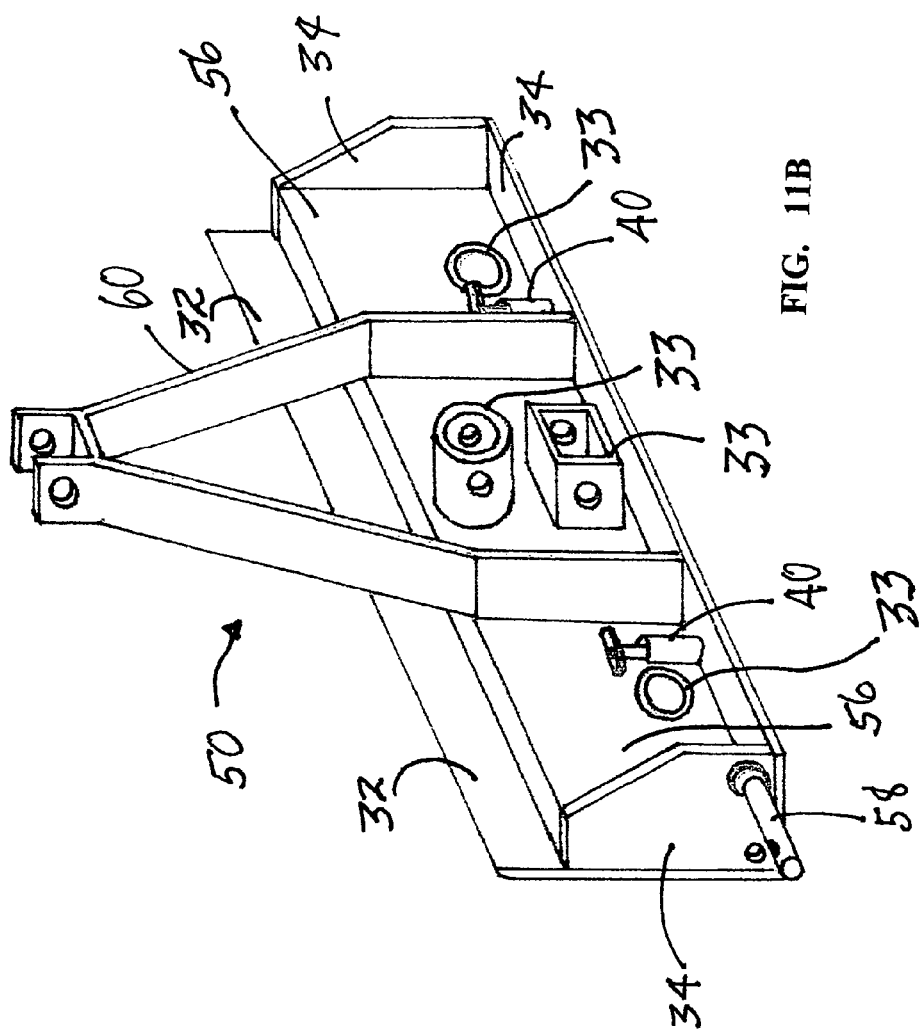
FIG. 11B is a perspective rear view of the embodiment of the coupler plate member of FIG. 11A of the present invention.
Figure 11C:
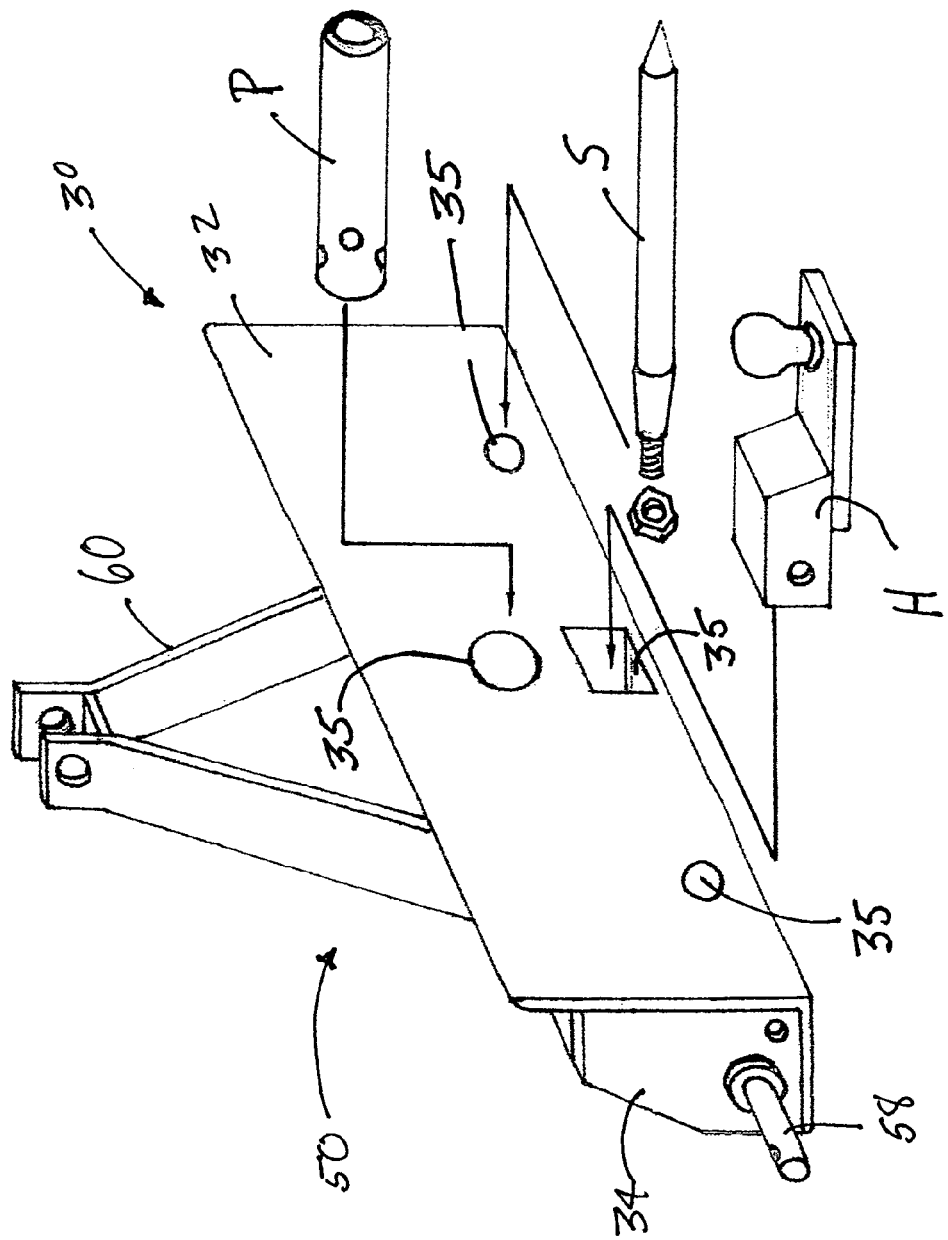
FIG. 11C is a perspective front view the embodiment of the coupler plate member of FIG. 11A of the present invention illustrating attachment of additional components thereto.

FIGS. 11A and 11B provide front and rear views of another embodiment of the connector assembly 50 that can be secured to the coupler plate member 30 of FIGS. 8 and 9. The connector assembly 50 includes a connector plate member 56 secured to the perimeter walls 34 of the coupler plate member 30 with each of a pair of opposed peg members 58 extending horizontally beyond opposite ends of the connector plate member 56. A fastener bracket 60 is secured to the connector plate member 56 and extends above the vertical plate section 32 of the coupler plate member 30. The pair of peg members 58 and fastener bracket 60 are adapted for attachment to a 3-point hitch of a machine, such as a tractor.

FIG. 11C illustrates the capability of square or round tubing 33, mounted perpendicular to the vertical plate section 32 with an open end 35 positioned at the surface of the vertical plate section 32, to be used for receiving and securing a tool therein. Examples of such tools include a receiver hitch H, a bale spear S, and a hollow peg P, as illustrated.

Figure 11D:
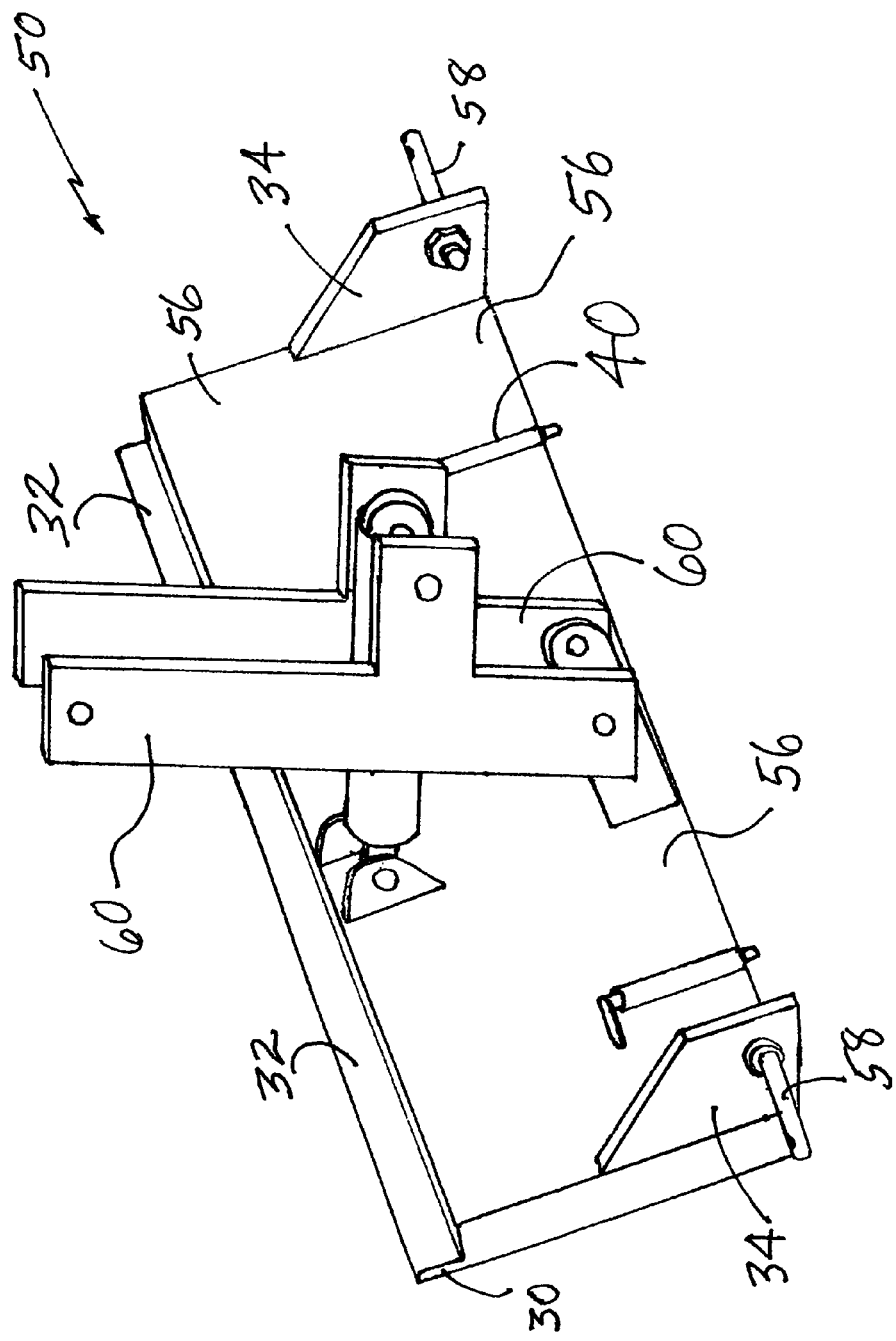
FIG. 11D is a perspective rear view of yet another embodiment of the coupler plate member of the present invention.

FIG. 11D provides a rear view of another embodiment of the connector assembly 50 that can be secured to a coupler plate member 30. The connector assembly 50 includes a connector plate member 56 secured to the perimeter walls 34 of the coupler plate member 30 with each of a pair of opposed peg members 58 extending horizontally beyond opposite ends of the connector plate member 56. A fastener bracket 60 is secured to the connector plate member 56 and extends above the vertical plate section 32 of the coupler plate member 30. The pair of peg members 58 and fastener bracket 60 are adapted for attachment to a 3-point hitch of a machine, such as a tractor.

Figure 12A:
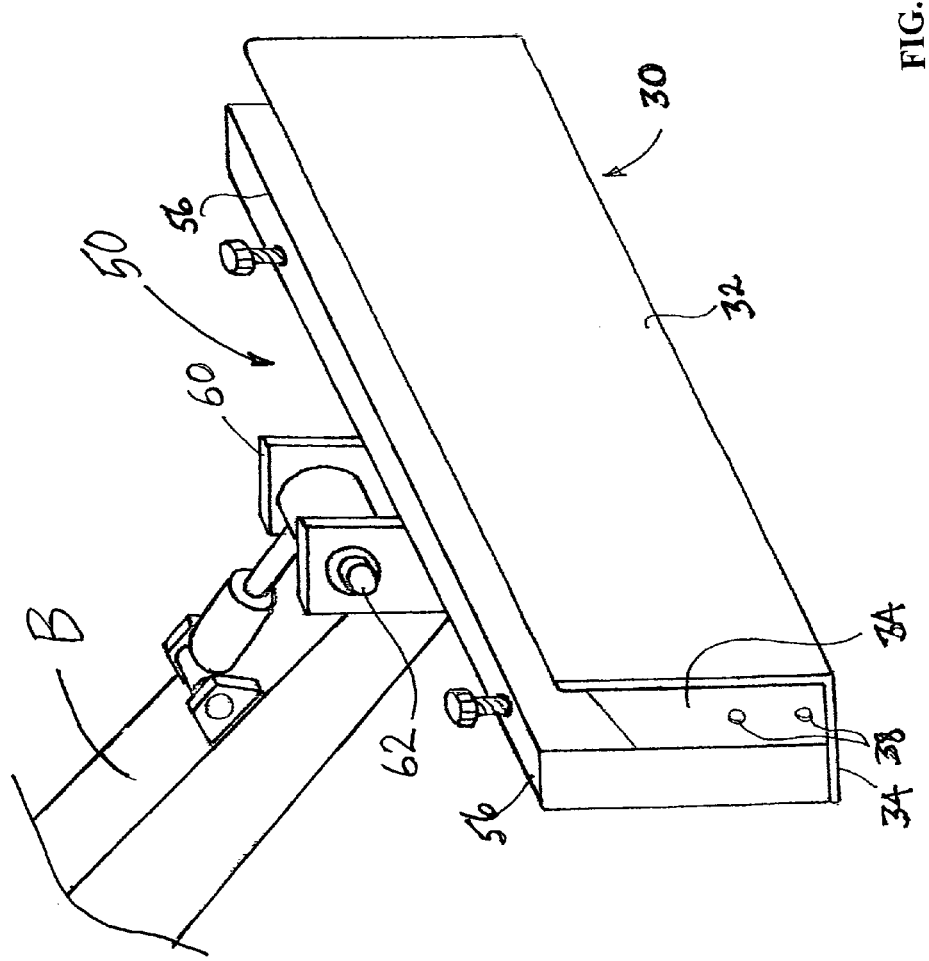
FIG. 12A is a perspective front view of yet another embodiment of the coupler plate member of the present invention attached to a single boom arm of a machine.
Figure 12B:
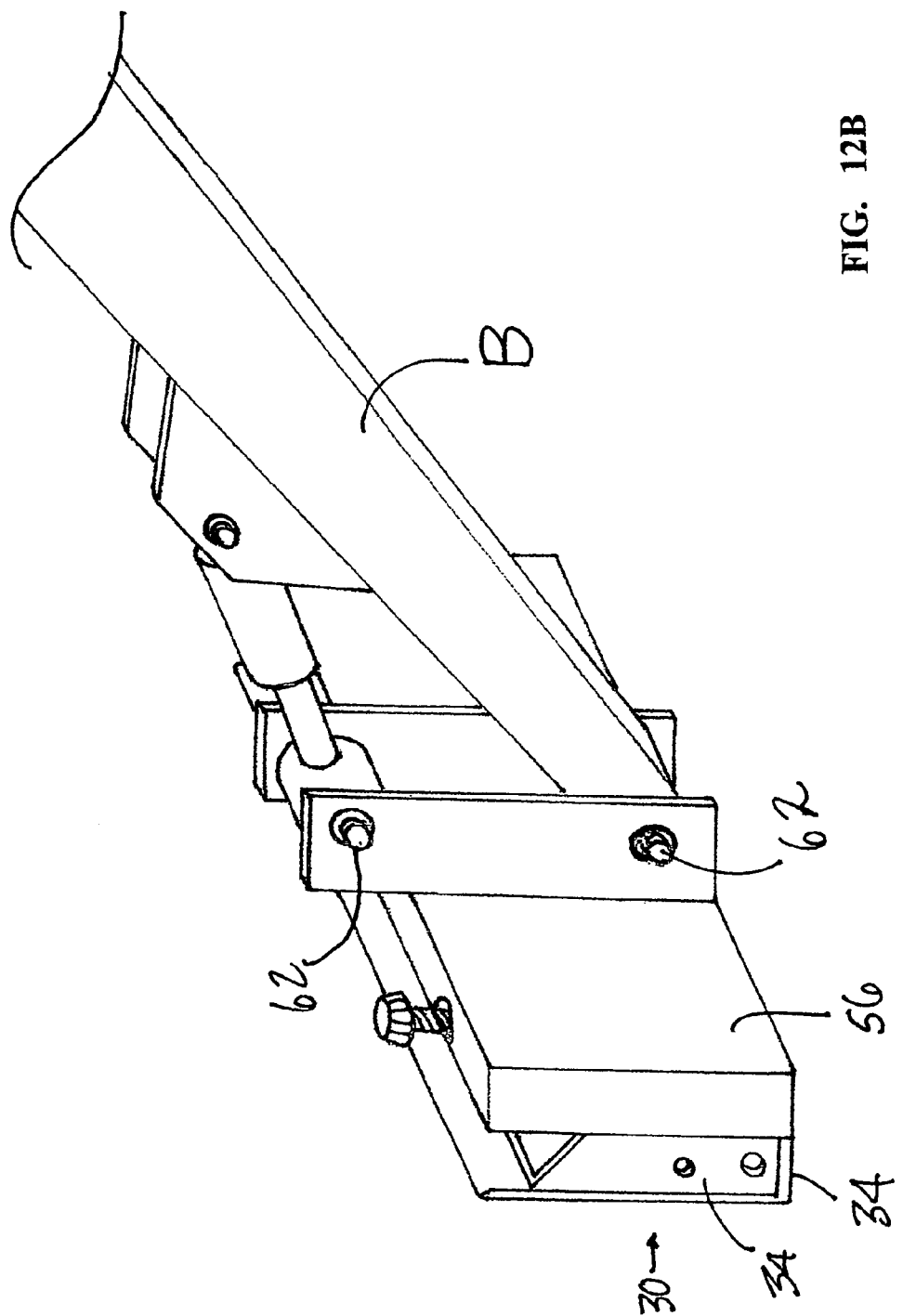
FIG. 12B is a perspective rear view of the embodiment of the coupler plate member of the present invention of FIG. 12A attached to a single boom arm of a machine.
Figure 13:
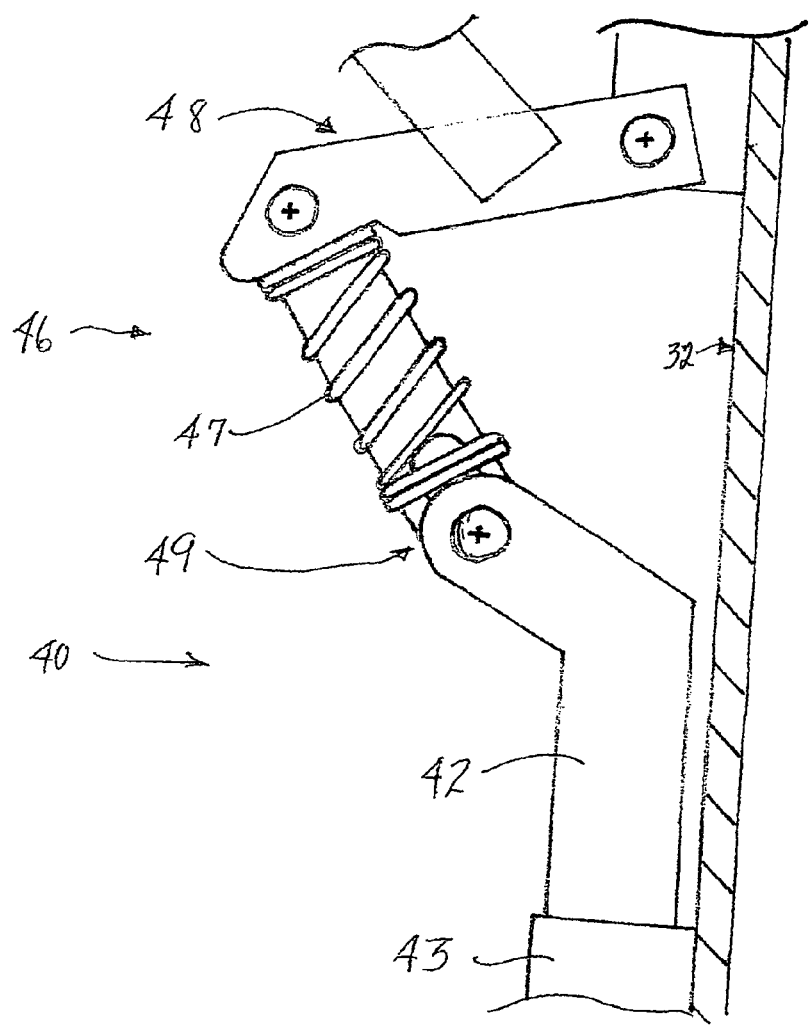
FIG. 13 is a perspective side view of one embodiment of the locking assembly in an unlocked condition of the present invention.
Figure 14:
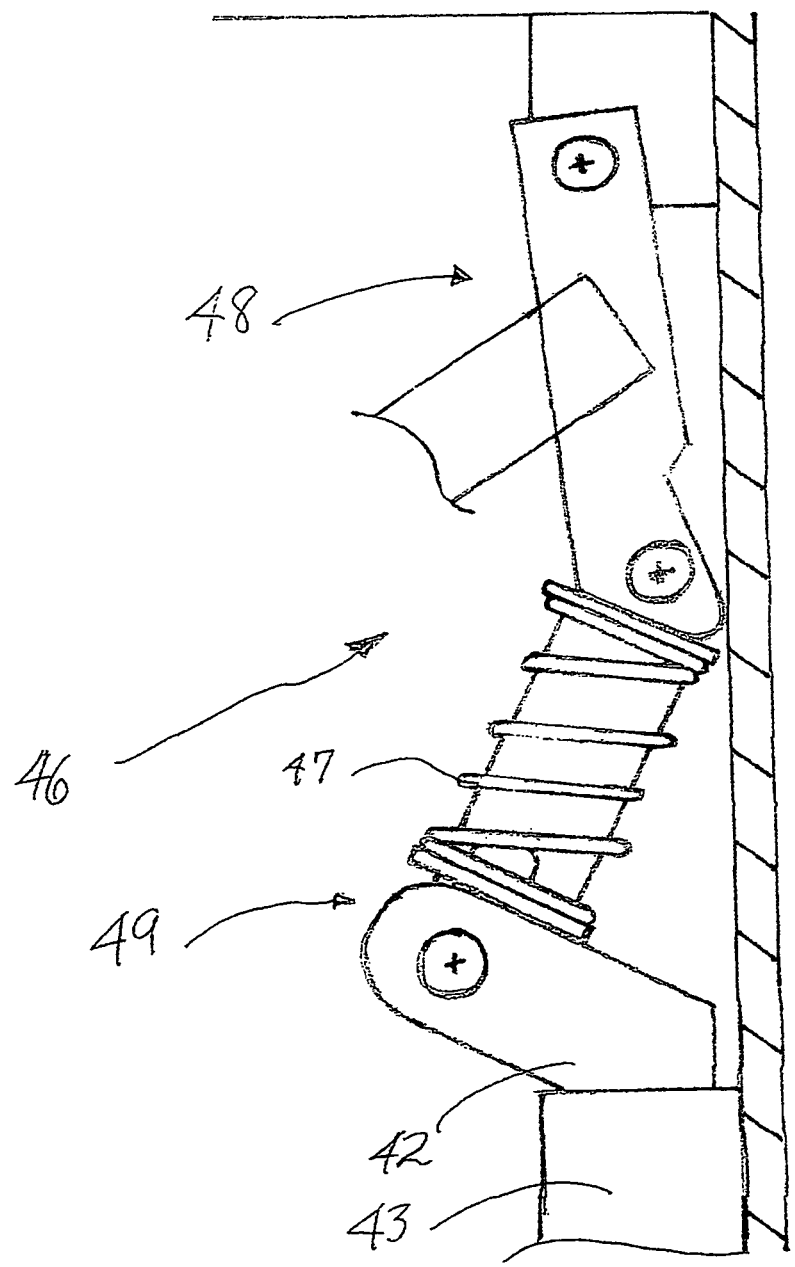
FIG. 14 is a perspective side view of one embodiment of the locking assembly in a locked condition of the present invention.
Figure 15:
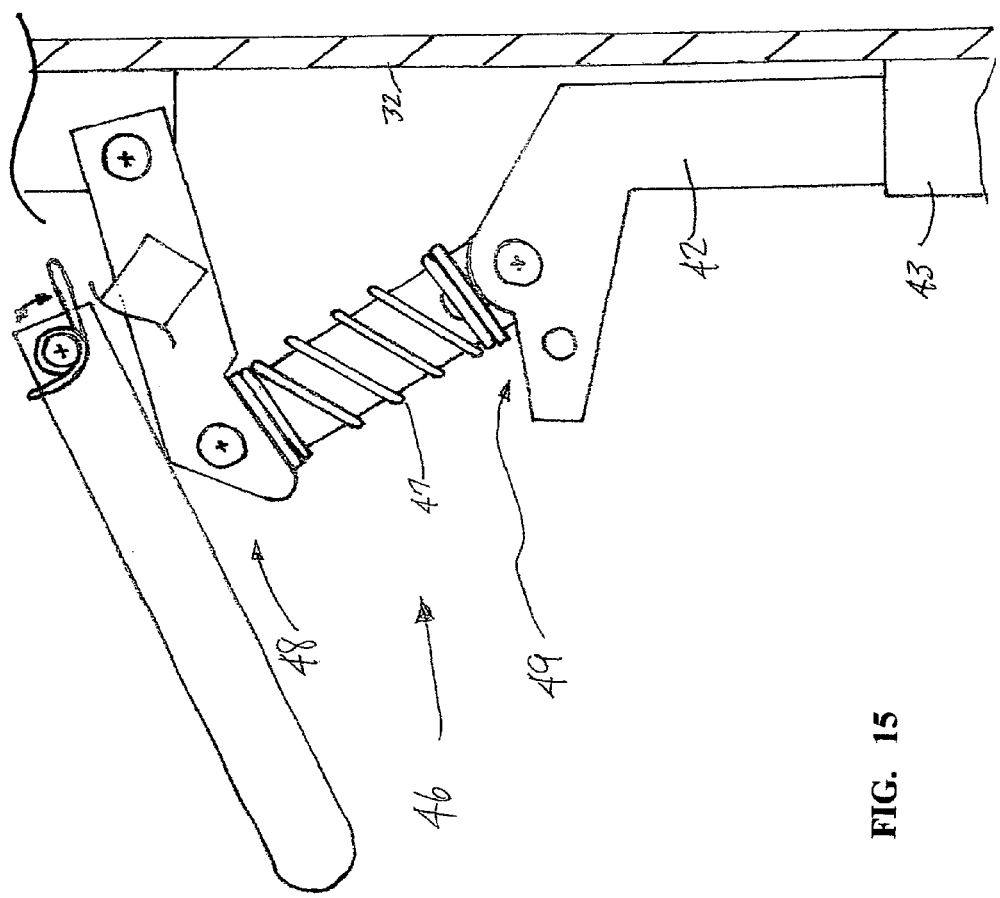
FIG. 15 is a perspective side view of a further embodiment of the locking assembly in an unlocked condition of the present invention.
Figure 16:
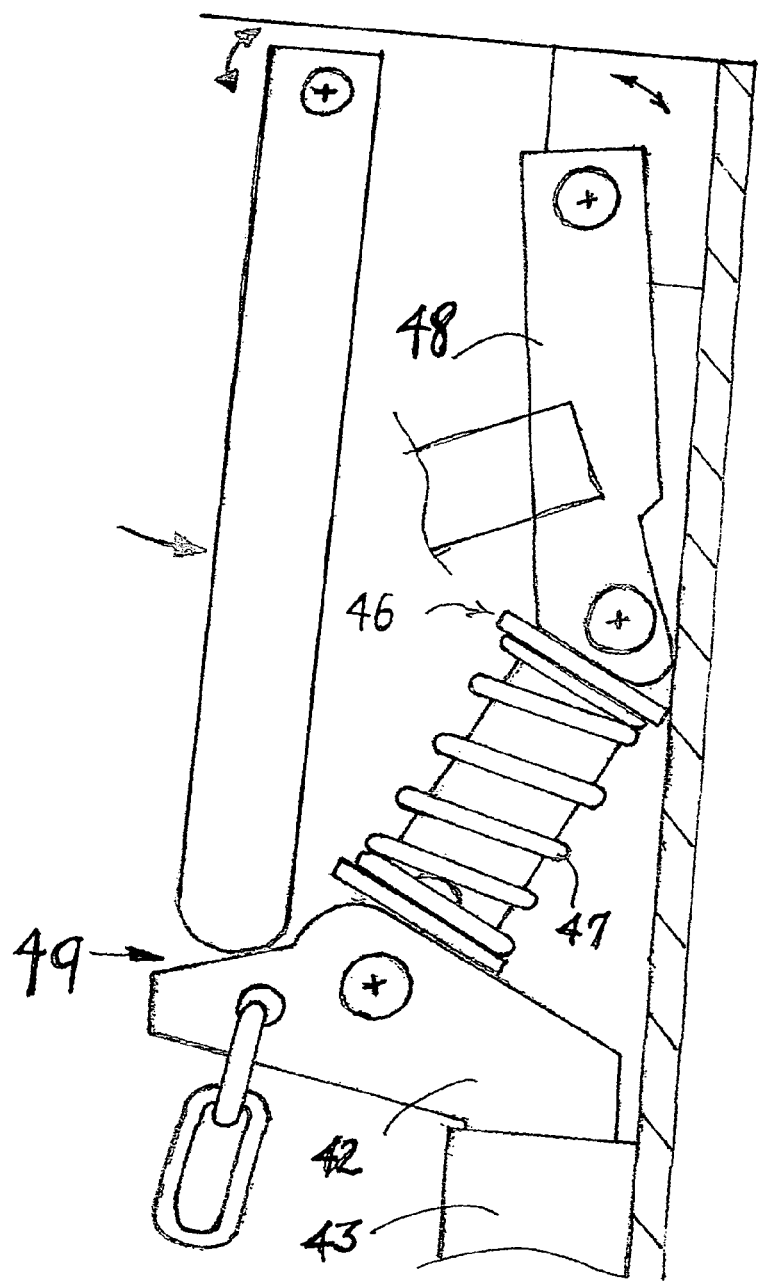
FIG. 16 is a perspective side view of a further embodiment of the locking assembly in a locked condition of the present invention.

Referring now to FIGS. 12A and 12B, another embodiment of the connector assembly 50 is shown secured to the coupler plate member 30 of FIGS. 6 and 7. The connector assembly 50 includes a connector plate member 56 secured to the perimeter walls 34 of the coupler plate member 30. In this embodiment, the connector assembly 50 includes two pivot point attachments 62 positioned in a vertical alignment. The pivot point attachments 62 are adapted for attachment to an arm of a single boom arm B of a machine, as depicted in FIGS. 12A and 12B.

Figure 17:
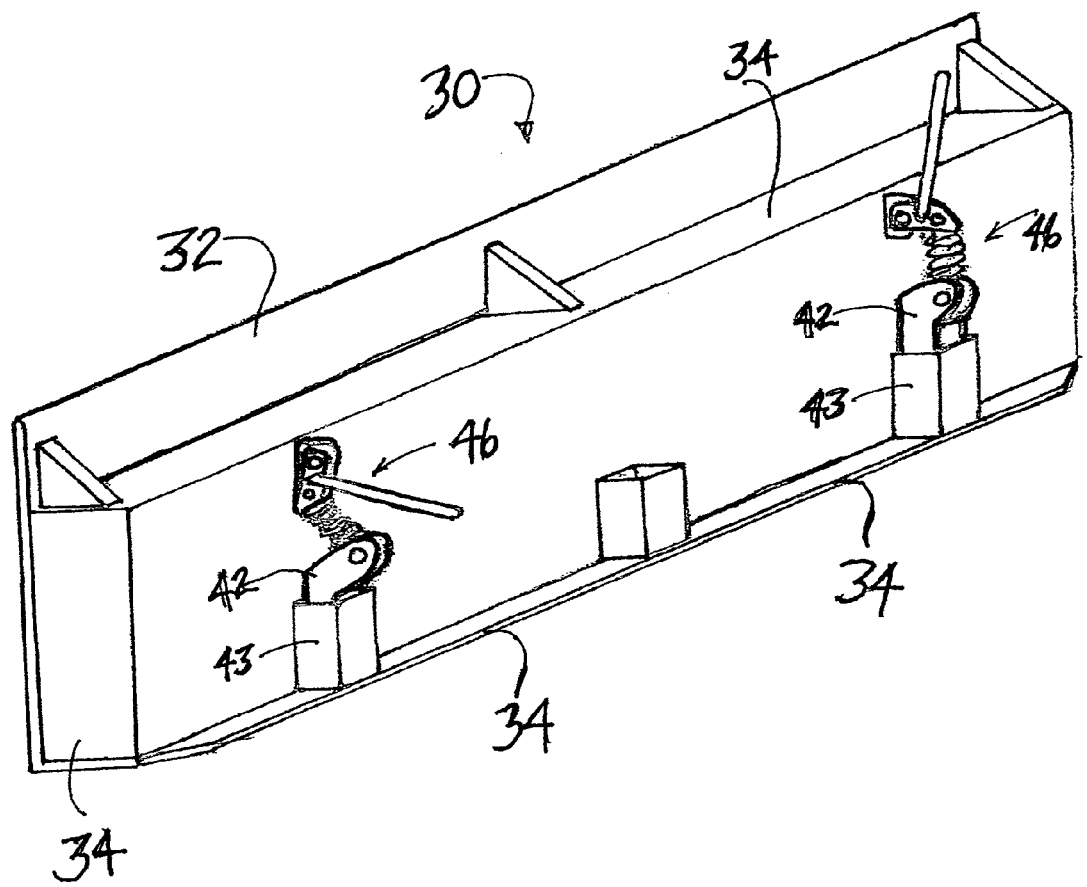
FIG. 17 is a perspective rear view of yet another embodiment of the coupler plate member with locking assemblies of the present invention.

FIGS. 13-17 disclose a preferred embodiment of the locking assembly 40 used to secure the coupler plate member 30 to the receiver plate member 20 to produce the receiver plate-coupler plate assembly 10 of the present invention. It is important that the locking assembly 40 be easy to operate, yet maintain a locked condition during use of an implement by an attached machine. The preferred embodiment of the locking assembly 40 includes at least one rigid, linear member 42 reversibly insertable into the at least one aperture 28 in the fourth perimeter wall 28 of the receiver plate member 20. In this preferred embodiment, a rod member 42 is slidably mounted in a tube member 43 fastened to the coupler plate member 30. The rod member 42 has a handle section 44 attached at one end to maintain the rod member 42 within the at least one aperture 28 in the perimeter wall 24 of the receiver plate member 20. The handle section 42 includes a spring-biased linkage 46 with an upper end 48 pivotally fastened to the coupler plate member 30 and a lower end 49 pivotally fastened to the rigid linear member 42. The spring-biased linkage 46 is offset from the rigid linear member 42 in one direction with the locking assembly 40 unlocked and offset from the rigid linear member 42 in an opposite direction with the locking assembly 40 locked. In FIG. 17, the coupler plate member 30 is shown with one locking assembly 40 in an unlocked condition and the other locking assembly 40 in a locked condition.

Figure 18B:
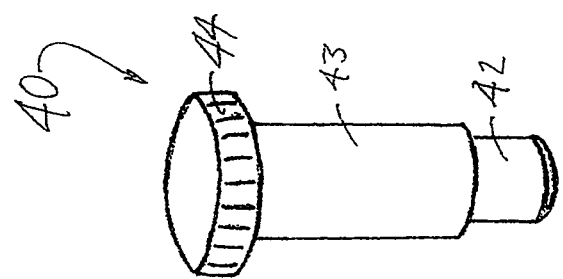
FIG. 18B is a perspective view of the locking assembly of FIG. 18A of the present invention in a locked condition
Figure 18A:
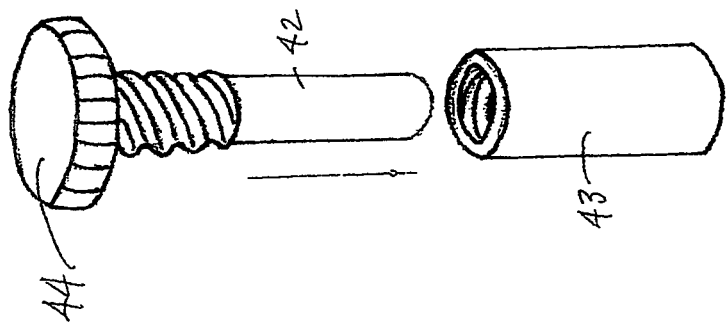
FIG. 18A is a perspective view of yet another locking assembly of the present invention.
Figure 19C:
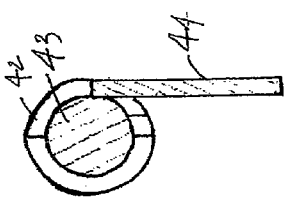
FIG. 19C is a perspective view of the locking assembly of FIG. 19A of the present invention in an unlocked condition.
Figure 19D:
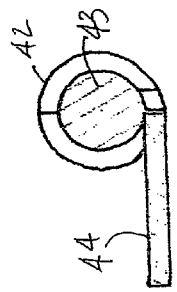
FIG. 19D is a top view of the locking assembly of FIG. 19C of the present invention.
Figure 19A:
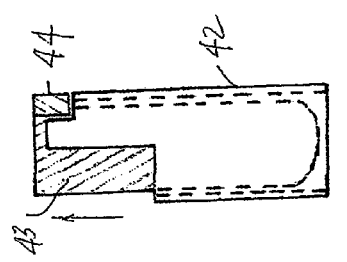
FIG. 19A is a perspective view of yet another locking assembly of the present invention in a locked condition.
Figure 19B:
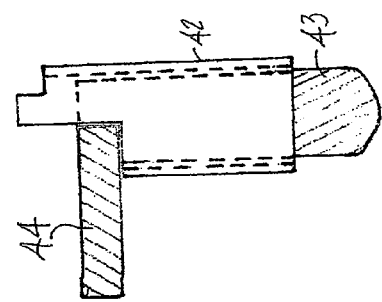
FIG. 19B is a top view of the locking assembly of FIG. 19A of the present invention.

Alternative embodiments of the locking assembly 40 are shown in FIGS. 18A and 18B, as well as in FIGS. 19A-19D. In FIGS. 18A and 18B, the rigid linear member 42 of the locking assembly 40 includes a threaded rod member 42 rotatably mounted in a threaded tube member 43 fastened to the coupler plate member 30.

In FIGS. 19A-19D, the rigid linear member 42 of the locking assembly 40 includes a rod member 42 slidably mounted in a tube member 43 fastened to the coupler plate member 30. The rod member 42 has a handle section 44 at one end to maintain the rod member 42 within the at least one aperture 28 in the perimeter wall 24 of the receiver plate member 20.

Figure 20A:
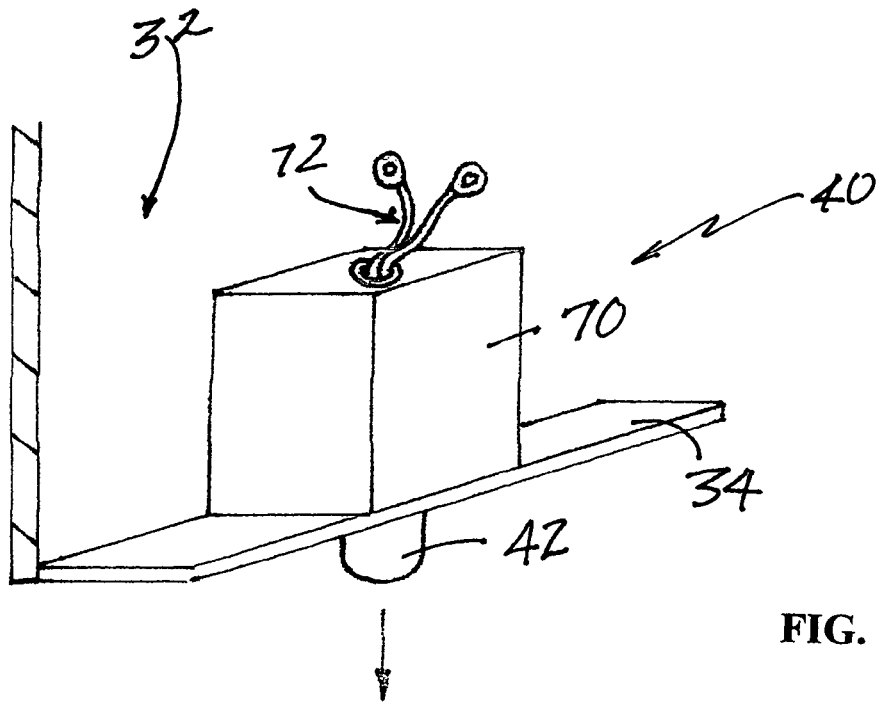
FIG. 20A is a perspective view of yet another locking assembly of the present invention in a locked condition.
Figure 20B:
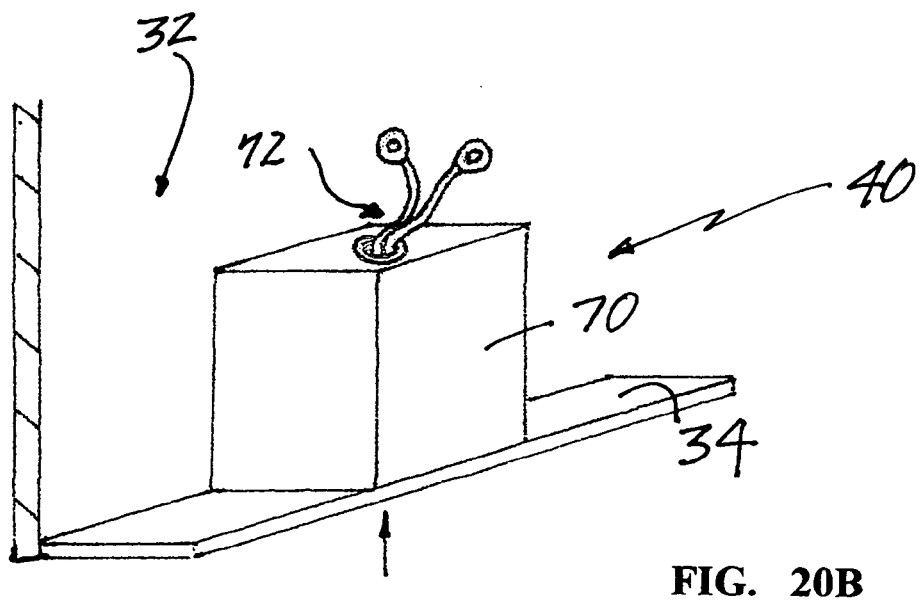
FIG. 20B is a perspective view of the locking assembly of FIG. 20A of the present invention in an unlocked condition.

The locking assembly 40 of FIGS. 20A and 20B includes a solenoid unit 70 with electrical control wires 72 used to lock and unlock the assembly 40. Actuating the solenoid unit 70 reversibly inserts a rigid linear member 40 into an aperture in a perimeter wall 24 of the receiver plate member 20. The rigid linear member 42 of the locking mechanism is shown in the locked position (FIG. 20A) and in the unlocked position (FIG. 20B). FIGS. 20C and 20D are perspective views of a second orientation of the locking assembly 40 of FIG. 20A of the present invention in an unlocked condition (FIG. 20C) and in a locked condition (FIG. 20D).

Figure 21A:
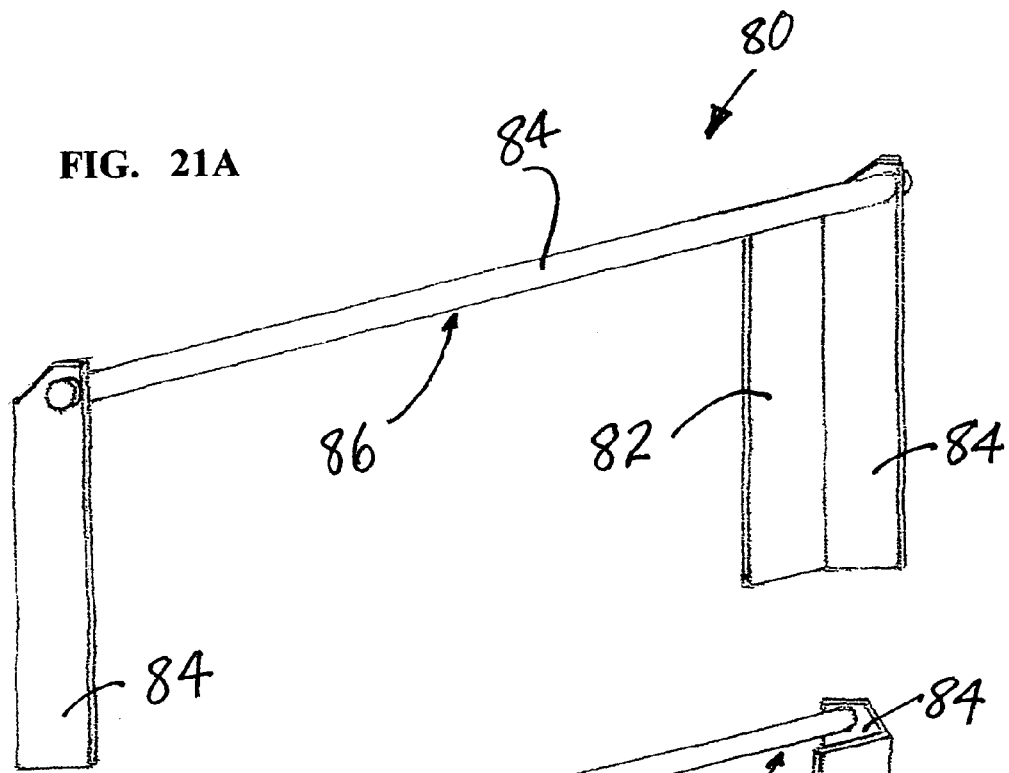
FIG. 21A is a perspective rear view of yet another embodiment of the receiver plate member of the present invention.
Figure 21B:
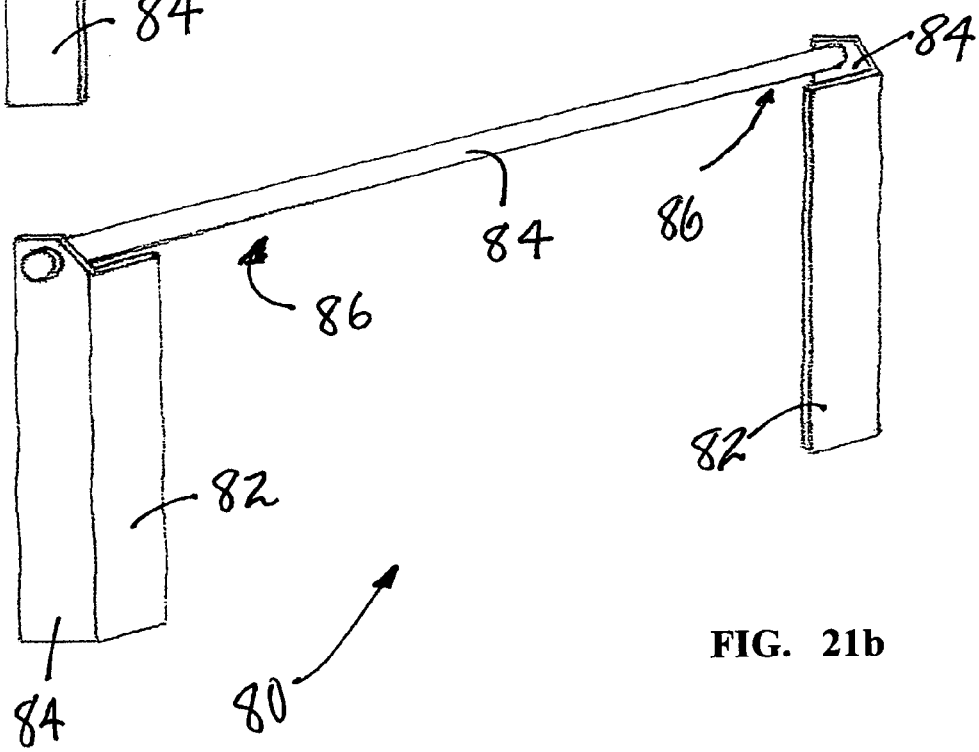
FIG. 21B is a perspective front view of the embodiment of the receiver plate member of FIG. 21A of the present invention.
Figure 22:
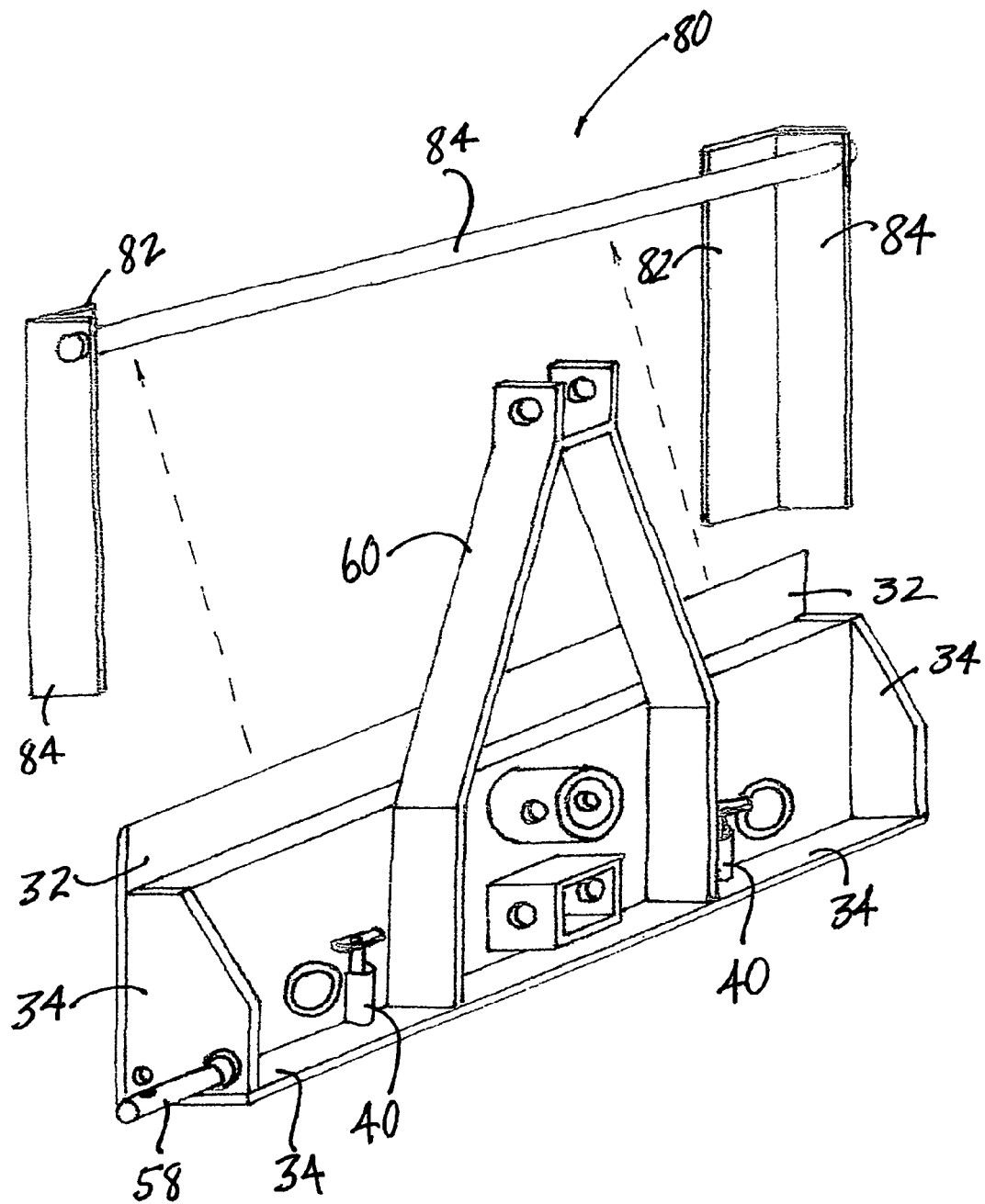
FIG. 22 is a perspective rear view of another embodiment of the receiver plate-coupler plate assembly of the present invention.

Referring now to FIGS. 21A and 21B, rear and front views of a modified receiver plate member 80 are shown. The receiver plate member 80 includes a vertical plate section 82 with at least three perimeter walls 84 extending in a common direction to form a downward facing cavity 86 there between. The vertical plate section 82 attaches to a tool on a plate section surface opposite the perimeter walls 84. FIG. 22 illustrates attachment of the modified receiver plate member 80 to the coupler plate member 30 and connector assembly 50 of FIGS. 11A and 11B.

Figure 23A:
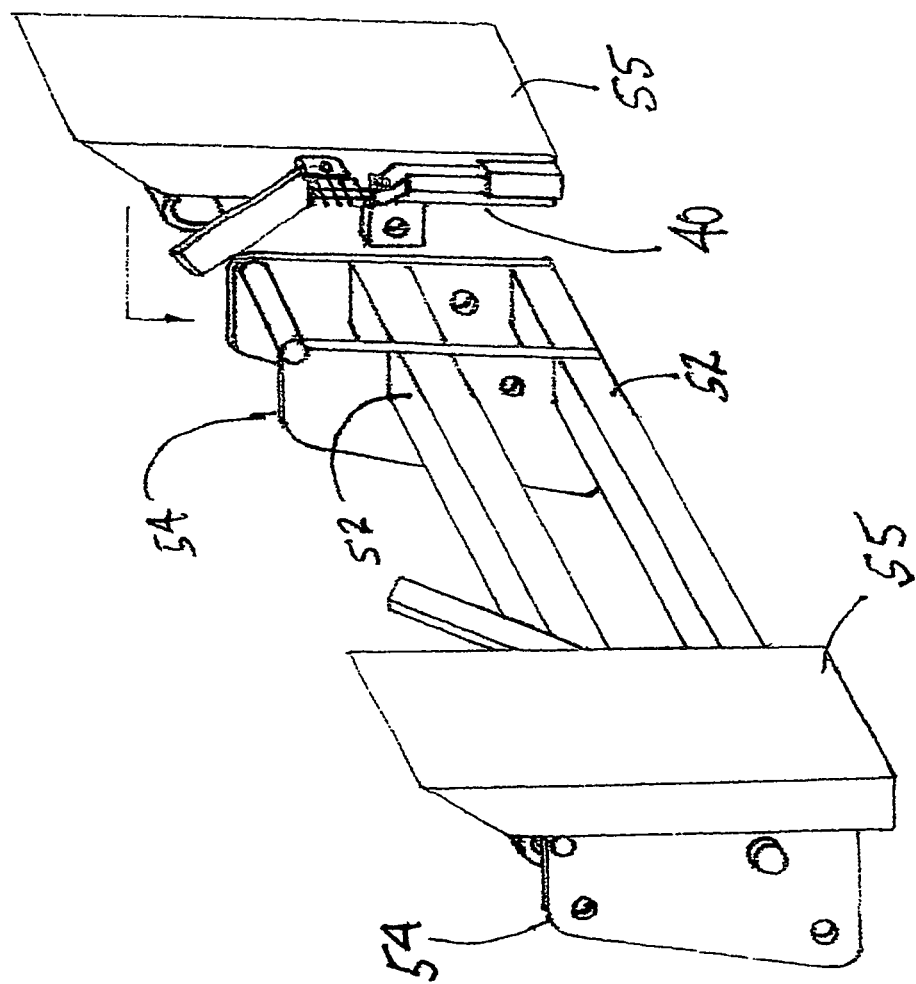
FIG. 23A is a perspective front view of another embodiment of the coupler plate assembly of the present invention.

FIG. 23A shows the connector assembly 50 of FIGS. 10A and 10B fitted with a pair of coupler plate extension members 55. The connector assembly is suitable for attachment to the two hydraulic arms of a machine, such as a tractor, by means of the bracket units 54 at opposite ends of the connector assembly 50. The coupler plate extension members 55 includes fastener devices 55a, best seen in FIGS. 23B and 23C, for securing the coupler plate extension members 55 to the bracket units 54. Each coupler plate extension members 55 includes a locking assembly 40 for securing the coupler plate extension members 55 to a receiver plate member 20.

Figure 23C:
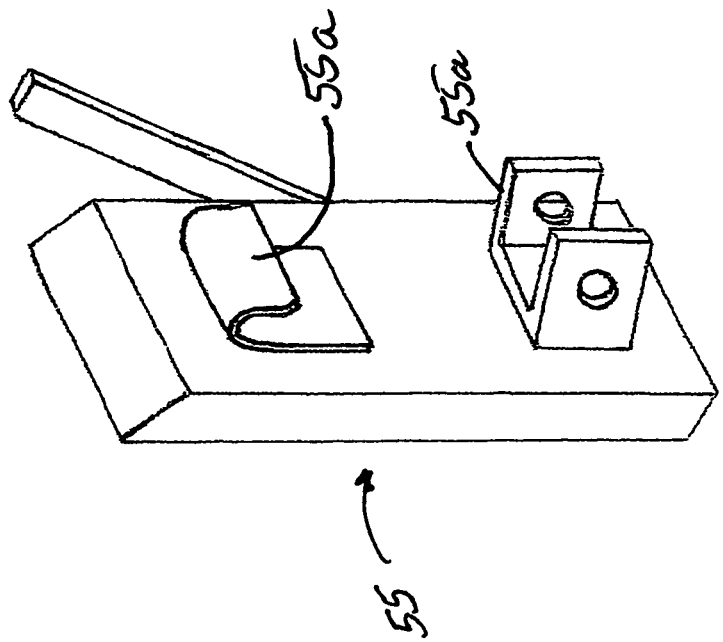
FIG. 23C is a perspective rear view of another embodiment of the attachment extension of the coupler plate member of FIG. 23A of the present invention.
Figure 23B:
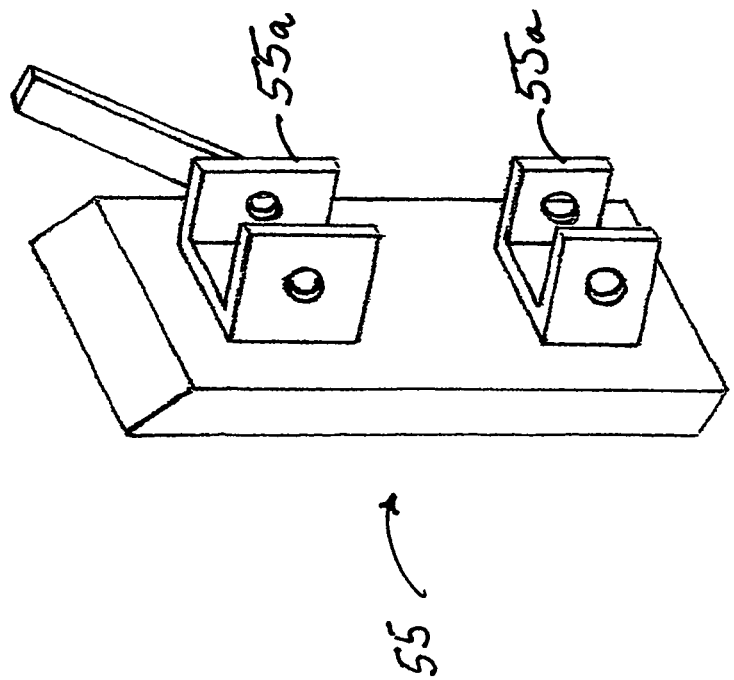
FIG. 23B is a perspective rear view of one embodiment of the attachment extension of the coupler plate member of FIG. 23A of the present invention.

FIGS. 23B and 23C show two embodiments of coupler plate extension members 55, each of which can be attached to one of the bracket members 54 to provide an extension of the vertical plate member 32. Such extension members 55 allow the coupler plate member 30 to be used with larger sized receiver plate members 20.

Figure 24A:
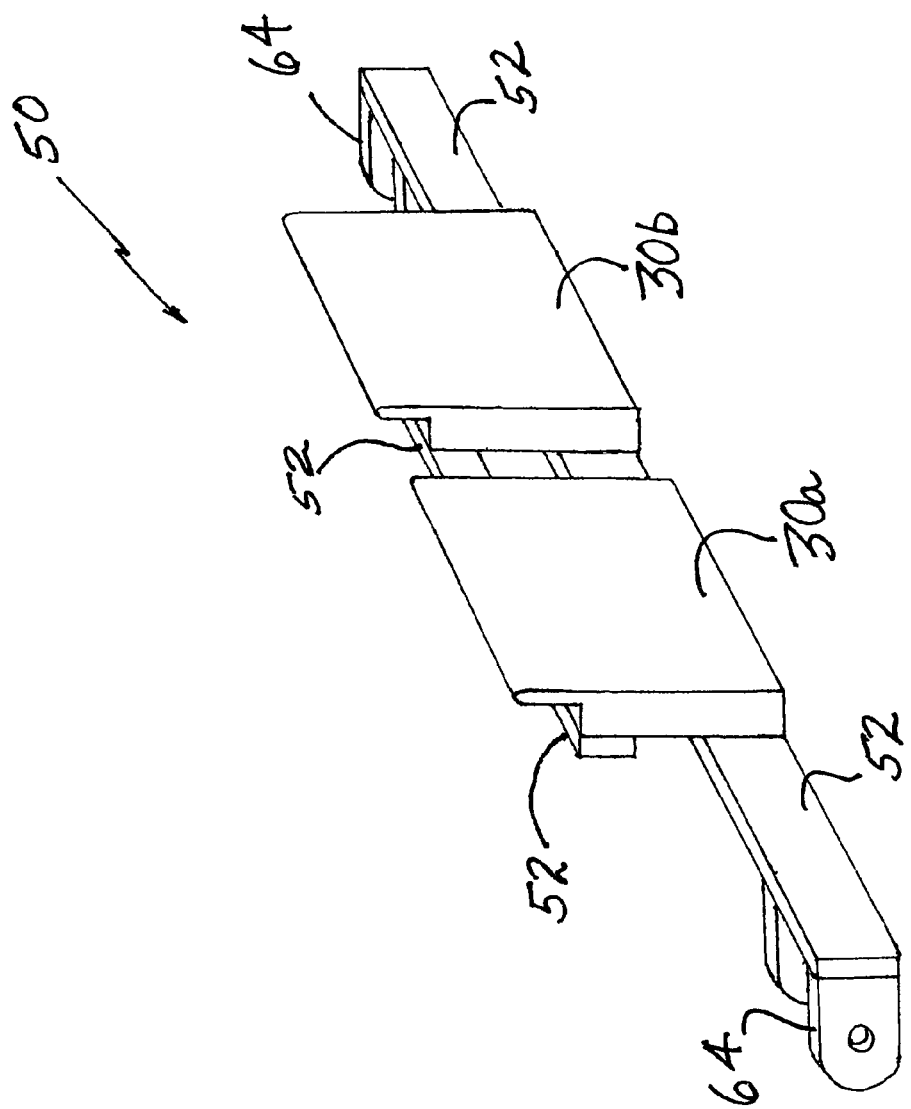
FIG. 24A is a perspective front view of another embodiment of the coupler plate member of the present invention.

Referring now to FIG. 24A, another embodiment of the coupler plate assembly 50 is illustrated. The assembly 50 includes a coupler plate member 30 divided vertically and slightly spaced apart. The assembly 50 includes a pair of linear members 52, secured horizontally to the divided coupler plate member 30, with the lower linear member of the pair 52 extending beyond the ends of the divided coupler plate member 30. A pivot point attachment bracket 62 is secured to the linear members 52 and positioned between the divided coupler plate member 30. The lower linear member of the pair 52, contains an attachment bracket 64 at each end. A pivot point attachment bracket 62 is positioned between the sections 30a, 30b of the coupler plate member 30 and fastened to both linear members 52. The pivot point attachment bracket 62 and attachment brackets 64 can be attached to a single cylinder operated boom, or to a three-point hitch of a machine for manipulating the coupler plate assembly 50.

Figure 24B:
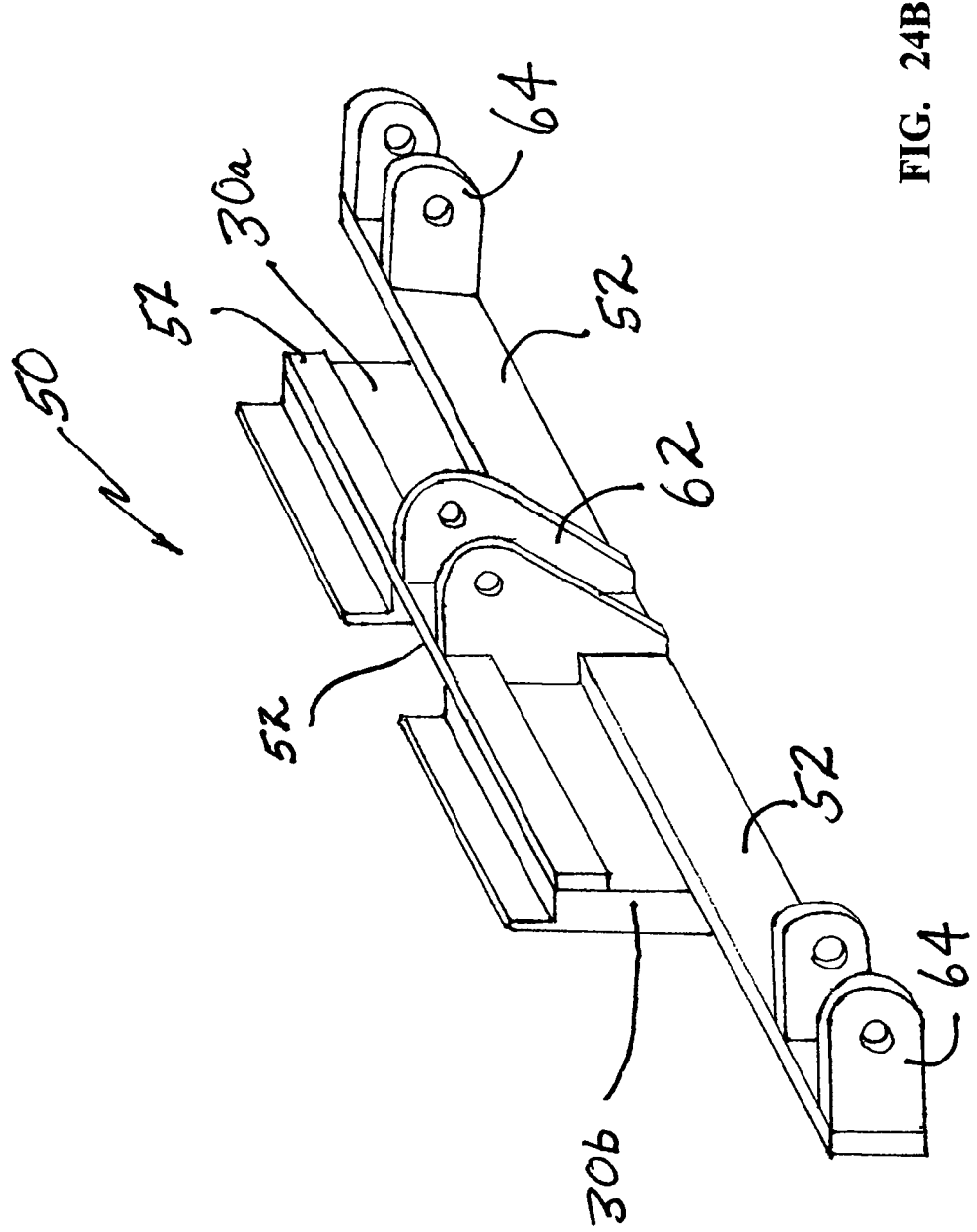
FIG. 24B is a perspective rear view of the embodiment of the coupler plate member of FIG. 24A of the present invention.
Figure 24C:
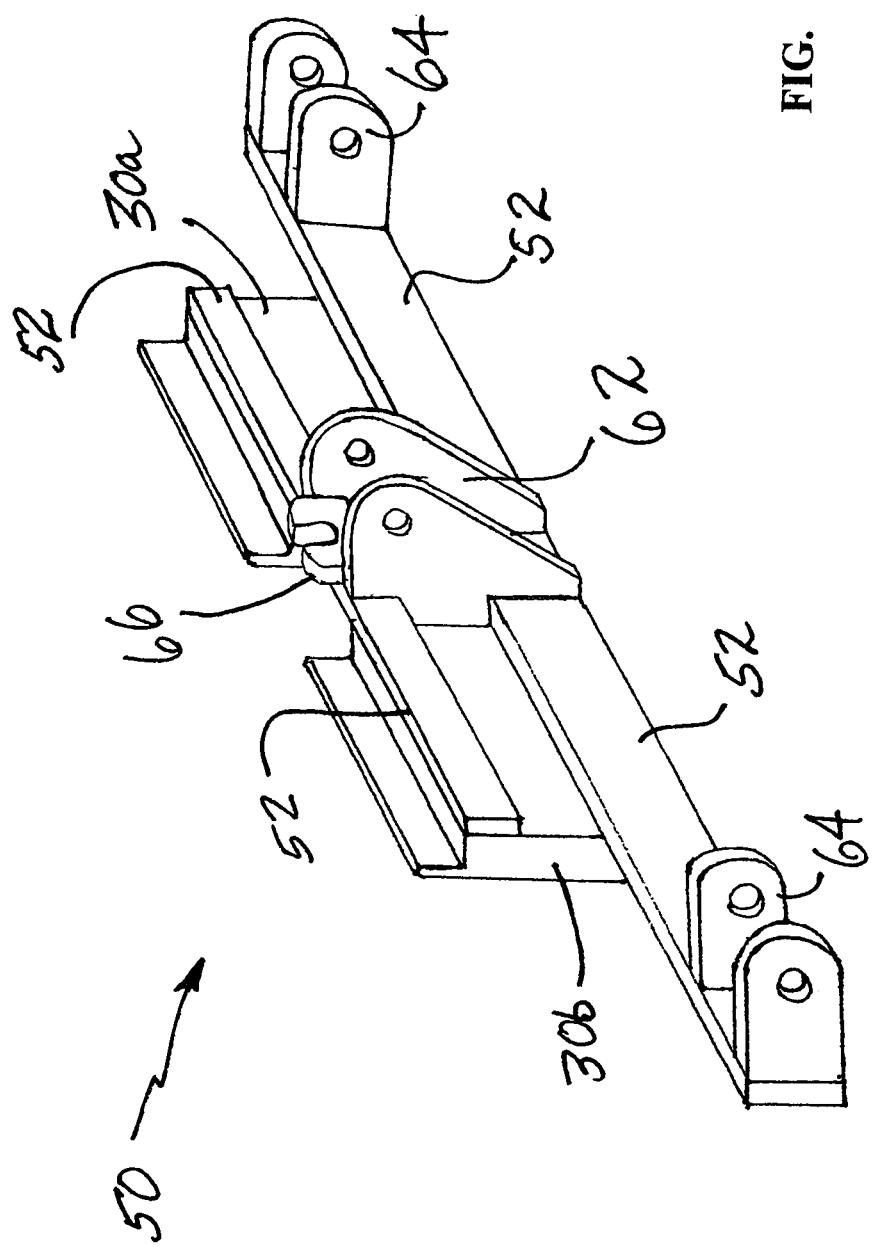
FIG. 24C is a perspective rear view of a further embodiment of the coupler plate member of FIG. 24A of the present invention.

FIG. 24C illustrated a further embodiment of the coupler plate assembly 50 of FIGS. 24A and 24B, where the pivot point attachment bracket 62 includes a chain hook notch 66 for securing a chain containing implement.

Figure 24D:
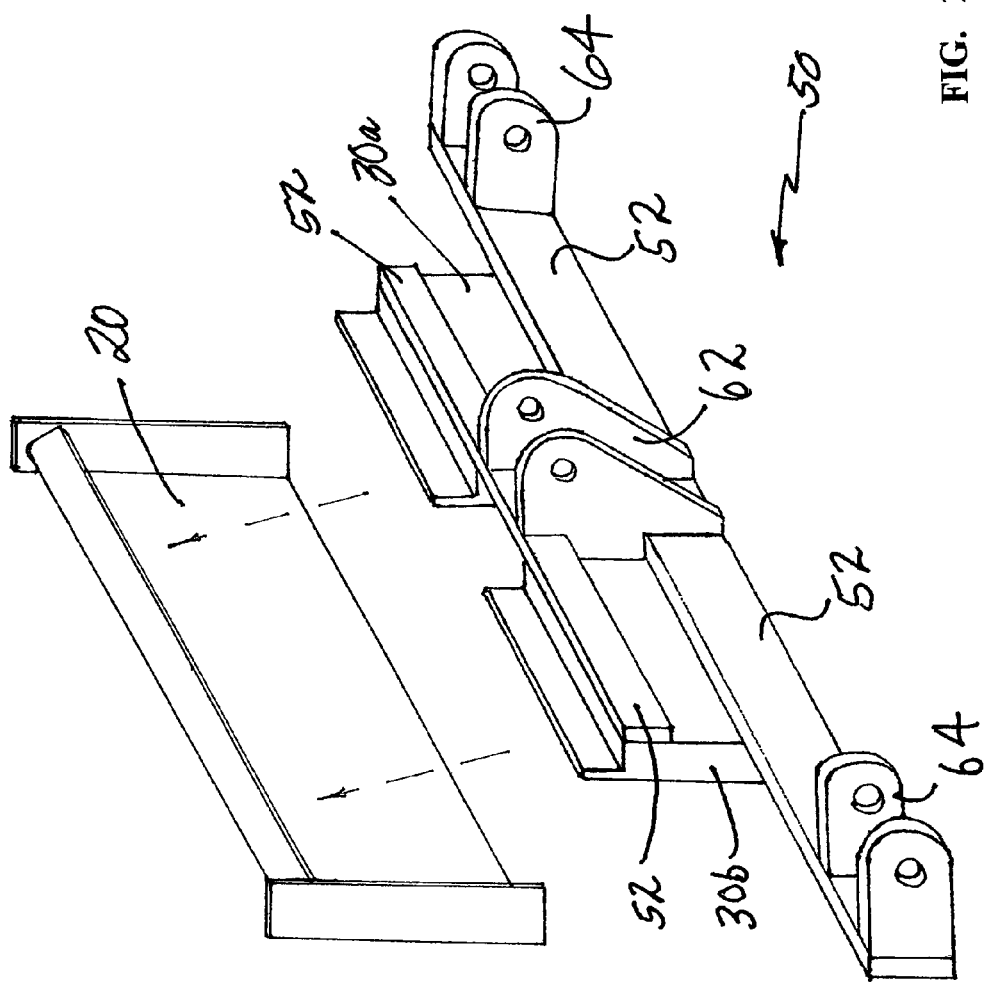
FIG. 24D is a perspective rear view of the embodiment of the coupler plate member of FIG. 24C engaging one embodiment of the receiver plate member of the present invention.
Figure 24E:
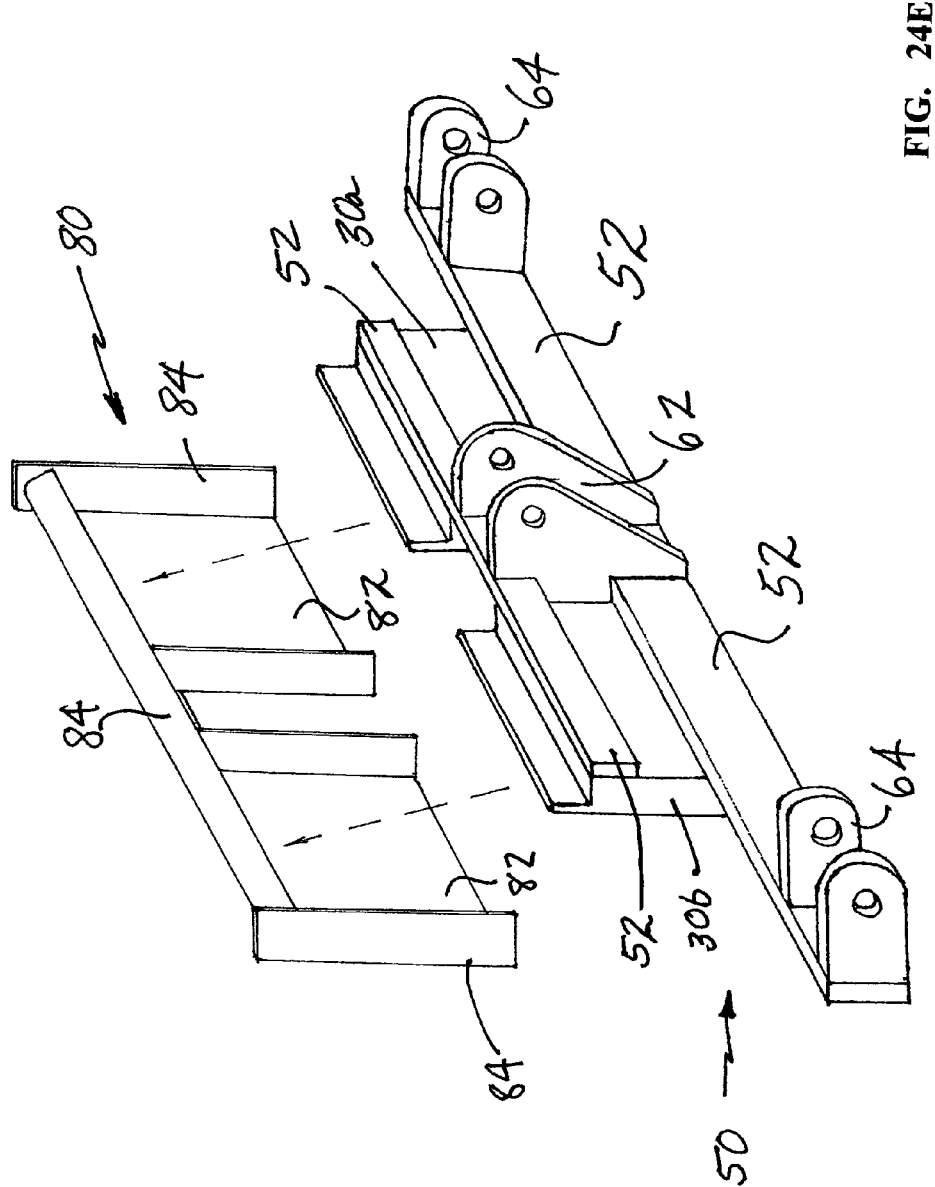
FIG. 24E is a perspective rear view of the embodiment of the coupler plate member of FIG. 24A engaging another embodiment of the receiver plate member of the present invention.
Figure 24F:
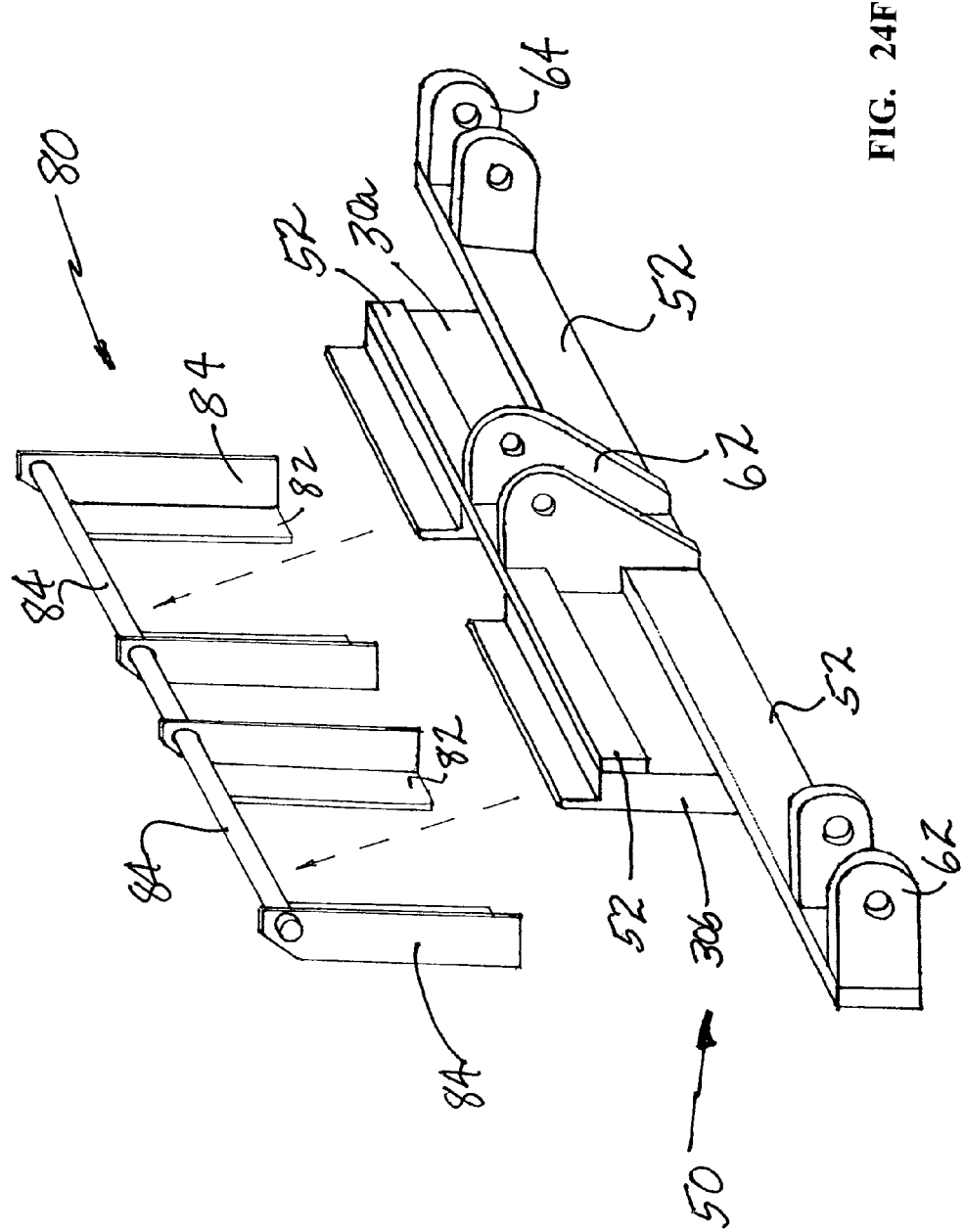
FIG. 24F is a perspective rear view of a further embodiment of the coupler plate member of FIG. 24A engaging another embodiment of the receiver plate member of the present invention.

FIG. 24D illustrates engagement of the coupler plate assembly 50 of FIG. 24A with a receiver plate member 20, while FIG. 24E illustrates engagement of the coupler plate assembly 50 of FIG. 24A with another embodiment of the receiver plate member 20. FIG. 24F illustrates engagement of the coupler plate assembly 50 of FIG. 24A with yet another embodiment of the receiver plate member 20.

The invention also includes methods for mounting mini skid steer attachments to various machines, including a tractor, a single boom machine and a machine having a 3-point hitch.

The method for mounting the attachments to a tractor includes providing a mini skid steer attachment containing a receiver plate having a vertical plate section with a plurality of perimeter walls extending in a common direction to form a downward facing cavity there between, and an implement secured to the vertical plate section opposite the plurality of perimeter walls. A coupler plate member is provided having a vertical plate section with a plurality of perimeter walls extending in a common direction, with at least one linear member secured horizontally to the plurality of perimeter walls and extending beyond the coupler plate member, with a bracket unit secured at each end of the at least one linear member. Each loader arm of the tractor is fastened to a bracket unit of the coupler plate member. Inserting the vertical plate section of the coupler plate member into the downward facing cavity of the mini skid steer attachment secures the coupler plate member to the mini skid steer attachment.

The method for mounting the attachments to a single boom machine includes the steps of providing a mini skid steer attachment containing a receiver plate having a vertical plate section with a plurality of perimeter walls extending in a common direction to form a downward facing cavity there between, and an implement secured to the vertical plate section opposite the plurality of perimeter walls. A coupler plate member is provided having a vertical plate section with a plurality of perimeter walls extending in a common direction, with a connector plate member secured to the plurality of perimeter walls. The connector plate member has two pivot point attachments in vertical alignment opposite the coupler plate member. The single boom of the machine is fastened to the two pivot point attachments of the connector plate member. Inserting the vertical plate section of the coupler plate member into the downward facing cavity of the mini skid steer attachment secures the coupler plate member to the mini skid steer attachment.

The method for mounting the attachments to a tractor with a 3-point hitch includes the steps of providing a mini skid steer attachment containing a receiver plate having a vertical plate section with a plurality of perimeter walls extending in a common direction to form a downward facing cavity there between, and an implement secured to the vertical plate section opposite the plurality of perimeter walls. A coupler plate member is provided having a vertical plate section with a plurality of perimeter walls extending in a common direction, with a connector plate member secured to the plurality of perimeter walls, the connector plate member having a pair of opposed pegs, each peg extending horizontally beyond opposite ends of the connector plate member and a fastener bracket secured to the connector plate member extending above the vertical plate of the coupler plate member. The 3-point hitch of the tractor is fastened to the pair of pegs and fastener bracket of the coupler plate member. Inserting the vertical plate section of the coupler plate member into the downward facing cavity of the mini skid steer attachment secures the coupler plate member to the mini skid steer attachment.

While the invention has been particularly shown and described with reference to preferred embodiments thereof, it will be understood by those skilled in the art that various changes in form and details may be made therein without departing from the spirit and scope of the invention.

I claim:

1. A receiver plate-coupler plate assembly adapted for attaching an implement to a machine comprising:
    a receiver plate member comprising a vertical plate section with at least three perimeter walls extending in a common direction to form a downward facing cavity there between, the perimeter walls including a pair of opposed apertures therein, the vertical plate section adapted for attachment to a tool on a plate section surface opposite the perimeter walls;
    a coupler plate member comprising a vertical plate section positioned against the receiver plate member within the downwardly facing cavity thereof, the vertical plate section having at least three perimeter walls extending in a common direction opposite the receiver plate member;
    at least one locking assembly reversibly maintaining the coupler plate member within the downward facing cavity of the receiver plate member; and
    a connector assembly secured to the at least three perimeter walls of the coupler plate member opposite the receiver plate member, the connector assembly adapted for connecting the receiver plate-coupler plate assembly to a machine;
    the connector assembly including a pair of parallel linear members secured horizontally to the perimeter walls of the coupler plate member with each end of each linear member extending beyond the coupler plate member, adjacent ends of the pair of linear members attached to one of a pair of bracket units, each bracket unit adapted for attachment to an individual hydraulically powered arm of a machine.

2. The receiver plate-coupler plate assembly of claim 1, wherein the receiver plate member includes a fourth perimeter wall extending in the common direction therefrom with at least one aperture therein.

3. The receiver plate-coupler plate assembly of claim 2, wherein the at least one locking assembly is secured to the coupler plate member.

4. The receiver plate-coupler plate assembly of claim 1, wherein the locking assembly includes a pair of rigid, linear members each reversibly insertable into one of the pair of opposed apertures in the perimeter walls of the receiver plate member, and a retainer pin securing each rigid, linear member within one of the opposed apertures in the perimeter wall of the receiver plate member.

5. The receiver plate-coupler plate assembly of claim 1, wherein the connector assembly of the coupler plate member includes at least one square tube with at least one aperture therein, the at least one square tube of the connector assembly adapted for receiving a connector mechanism from a machine.

6. A receiver plate-coupler plate assembly adapted for attaching an implement to a machine comprising:
    a receiver plate member comprising a vertical plate section with four perimeter walls extending in a common direction to form a downward facing cavity there between, the perimeter walls including a pair of opposed apertures therein, the vertical plate section adapted for attachment to a tool on a plate section surface opposite the perimeter walls;
    a coupler plate member comprising a vertical plate section positioned against the receiver plate member within the downwardly facing cavity thereof, the vertical plate section having at least three perimeter walls extending in a common direction opposite the receiver plate member;
    at least one locking assembly on the coupler plate member reversibly engaging the receiver plate member to maintain the coupler plate member within the downward facing cavity thereof; and
    a connector assembly secured to the at least three perimeter walls of the coupler plate member opposite the receiver plate member, the connector assembly adapted for connecting the receiver plate-coupler plate assembly to a machine;
    the connector assembly including a pair of parallel linear members secured horizontally to the perimeter walls of the coupler plate member with each end of each linear member extending beyond the coupler plate member, adjacent ends of the pair of linear members attached to one of a pair of bracket units, each bracket unit adapted for attachment to an individual hydraulically powered arm of a machine.

7. The receiver plate-coupler plate assembly of claim 6, wherein the locking assembly includes a pair of rigid, linear members each reversibly insertable into one of the pair of opposed apertures in the perimeter walls of the receiver plate member, and a retainer pin securing each rigid, linear member within one of the opposed apertures in the perimeter wall of the receiver plate member.

8. The receiver plate-coupler plate assembly of claim 6, wherein the connector assembly of the coupler plate member includes at least one square tube with at least one aperture therein, the at least one square tube of the connector assembly adapted for receiving a connector mechanism from a machine.

9. The receiver plate-coupler plate assembly of claim 6, wherein the connector assembly of the coupler plate member includes a connector plate member secured to the perimeter walls of the coupler plate member with a pair of opposed pegs, each peg extending horizontally beyond opposite ends of the connector plate member and a fastener bracket secured to the connector plate member and extending above the vertical plate of the coupler plate member, the pair of pegs and fastener bracket adapted for attachment to a 3-point hitch of a machine.

10. A receiver plate-coupler plate assembly adapted for attaching an implement to a machine comprising:
- a receiver plate member comprising a vertical plate section with four perimeter walls extending in a common direction to form a downward facing cavity there between, the vertical plate section adapted for attachment to a tool on a plate section surface opposite the perimeter walls;
- a coupler plate member comprising a vertical plate section positioned against the receiver plate member within the downwardly facing cavity thereof, the vertical plate section having at least three perimeter walls extending in a common direction opposite the receiver plate member;
- at least one locking assembly on the coupler plate member reversibly engaging the receiver plate member to maintain the coupler plate member within the downward facing cavity thereof, the receiver plate member including at least one aperture in a perimeter wall and the locking assembly including at least one rigid, linear member reversibly insertable into the at least one aperture in the perimeter wall of the receiver plate member; and
- a connector assembly secured to the at least three perimeter walls of the coupler plate member opposite the receiver plate member, the connector assembly adapted for connecting the receiver plate-coupler plate assembly to a machine;
- the connector assembly including a pair of parallel linear members secured horizontally to the perimeter walls of the coupler plate member with each end of each linear member extending beyond the coupler plate member, adjacent ends of the pair of linear members attached to one of a pair of bracket units, each bracket unit adapted for attachment to an individual hydraulically powered arm of a machine.

* * * * *